(12) United States Patent
Sugitani

(10) Patent No.: US 7,651,436 B2
(45) Date of Patent: Jan. 26, 2010

(54) GEAR MECHANISM, PLANETARY GEAR DEVICE, ROTATING BEARING DEVICE, AND MAGICAL PLANETARY GEAR SPEED REDUCER

(76) Inventor: Nobuyoshi Sugitani, 8-10, Senpukugaoka 3-chome, Susono-shi, Shizuoka (JP) 410-1115

( * ) Notice: Subject to any disclaimer, the term of this patent is extended or adjusted under 35 U.S.C. 154(b) by 404 days.

(21) Appl. No.: 11/628,769

(22) PCT Filed: Jun. 7, 2005

(86) PCT No.: PCT/JP2005/010417

§ 371 (c)(1),
(2), (4) Date: Dec. 7, 2006

(87) PCT Pub. No.: WO2005/124188

PCT Pub. Date: Dec. 29, 2005

(65) Prior Publication Data

US 2007/0238571 A1    Oct. 11, 2007

(30) Foreign Application Priority Data

Jun. 22, 2004    (JP)    ............................. 2004-184238

(51) Int. Cl.
*F16H 57/08* (2006.01)
(52) U.S. Cl. ..................... 475/342; 475/341; 475/904
(58) Field of Classification Search .................. 74/384, 74/413, 414, 420, 424.5; 475/84, 28, 74, 475/78, 83, 221, 225, 341, 342, 344, 904
See application file for complete search history.

(56) References Cited

U.S. PATENT DOCUMENTS 1,989,663 A    2/1935    Bethune 2,266,888 A    12/1941    McCurdy et al
2,683,379 A  *  7/1954    Strandgren ............... 74/424.92
2,697,365 A  *  12/1954    Williams .................... 475/218
2,982,146 A    5/1961    Stoeckicht (Continued)

FOREIGN PATENT DOCUMENTS

| JP | S51-44871 | 10/1976 |
|---|---|---|
| JP | UM S51-44871 | 10/1976 |
| JP | S57-69157 | 4/1982 |
| JP | S60-188641 | 9/1985 |
| JP | UM S60-109718 | 2/1987 |

(Continued)

OTHER PUBLICATIONS

"Source of Machinery, New Edition", Source of Machinery Revived Committee, published by Rikogakusha Publishing Co., Ltd. in Mar. 25, 1976, 9th version, p. 53-54.

*Primary Examiner*—David D Le
*Assistant Examiner*—Justin Holmes
(74) *Attorney, Agent, or Firm*—Manabu Kanesaka

(57) ABSTRACT

A gear mechanism having extremely less backlash, capable of suppressing the rattling noise of gears, having a large loading resistance in the thrust direction, and capable of transmitting high torque by using the gears transmitting a force by the meshing of the gears with each other in place of the transmission of the force by friction. The gear mechanism is formed by disposing the plurality of spur gears in the meshed state with each other. The screw-like gears (2) and (4) are disposed on the same axis as the spur gears (1) and (3) in the meshed state with each other. The screw-like gears (2) and (4) adjacent to each other are formed in screw shapes having lead angles extending in the reverse directions to each other and equal in angle to each other. The spur gear (1) and the screw-like gear (2) are rotated integrally with each other to transmit its rotation to the spur gear (3) and the screw-like gear (4) adjacent to each other.

13 Claims, 15 Drawing Sheets

U.S. PATENT DOCUMENTS

Figure 1:
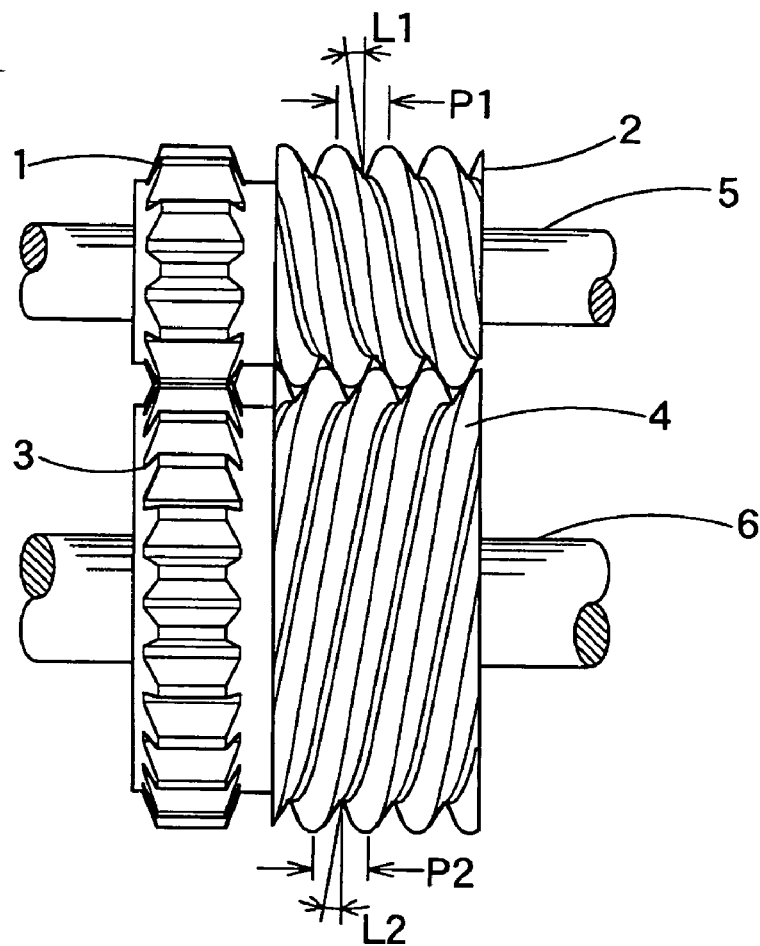

| | | | |
|---|---|---|---|
| 2,996,070 A | | 8/1961 | Ries |
| 3,095,761 A | * | 7/1963 | Hilado .................. 475/227 |
| 3,173,304 A | * | 3/1965 | Strandgren ............ 74/424.93 |
| 3,406,584 A | * | 10/1968 | Roantree ............... 74/424.92 |
| 3,595,094 A | * | 7/1971 | Lemor ................... 74/89.14 |
| 4,440,042 A | | 4/1984 | Holdeman |
| 4,470,646 A | | 9/1984 | Fuchsluger |
| 4,576,057 A | | 3/1986 | Saari |
| 4,615,229 A | | 10/1986 | Granbom |
| 4,850,247 A | * | 7/1989 | Yu ........................ 475/342 |
| 4,964,314 A | | 10/1990 | Wilkes |
| 5,242,336 A | * | 9/1993 | Hori ...................... 475/336 |
| 5,679,089 A | * | 10/1997 | Levedahl ............... 475/332 |
| 6,026,696 A | * | 2/2000 | Hehl ..................... 74/424.92 |
| 6,290,624 B1 | * | 9/2001 | Kam ...................... 475/251 |
| 6,348,022 B1 | * | 2/2002 | Jin ........................ 475/342 |
| 7,000,495 B2 | * | 2/2006 | Benoit ................... 74/424.92 |

FOREIGN PATENT DOCUMENTS

| | | |
|---|---|---|
| JP | H03-41702 | 6/1991 |
| JP | H3-95001 | 9/1991 |
| JP | UM H03-95001 | 9/1991 |
| JP | H11-247846 | 9/1999 |
| JP | 2000-274495 | 10/2000 |
| JP | 2001-99242 | 4/2001 |
| JP | 2003-194158 | 7/2003 |
| WO | WO 00/49261 | 8/2000 |

* cited by examiner

GEAR MECHANISM, PLANETARY GEAR DEVICE, ROTATING BEARING DEVICE, AND MAGICAL PLANETARY GEAR SPEED REDUCER

TECHNICAL FIELD

The present invention relates to a so-called rotation transmission mechanism that transmits rotation by meshing of gears. More particularly, it relates to a gear mechanism as being a rotation transmission mechanism using both spur gears and screw-shaped helical gears with helical angles. Furthermore, it relates to a planetary gear device, a rotating bearing device, and a magical planetary gear speed reducer using the gear mechanism.

BACKGROUND ART

Gear transmission mechanisms being the basis of the machine industry have a long history, and it is considered that most of the gear mechanisms were invented before Roman times. In addition, prototypes of screws also date back to Roman times. The gear mechanisms invented in recent years include harmonic drives, which were invented about 40 years ago, or so, and fundamental inventions are virtually non-existent.

Moreover, with regard to bearings, processing techniques for spherical shapes have advanced, and the bearings, which were invented about 80 years ago, are currently in the prime of production and have formed a large industry with a production yield exceeding 50 billion yen in Japan. Thus, rotation mechanisms are of an important and underlying field of social infrastructures, and development and evolution thereof are indispensable for a further social development.

Non-Patent Document 1: "Machine Elements Vol." authored by Kineo Hayashi, Corona Publishing, published Jul. 1, 1982, pp.117-pp.133

Patent Document 1: Japanese Published Unexamined Patent Application No. 2000-274495

DISCLOSURE OF THE INVENTION

Problems Solved by the Invention

Conventionally, spur gear mechanisms have been the most commonly used gear mechanisms. Spur gears have the simplest gear forms, most gears are of this type, and the spur gears have been described in detail in the abovementioned Non-Patent Document 1 and the like.

However, these gears have a large backlash, and can be said to be gears having a large rattling noise since the teeth make intermittent contact. In addition, the meshing ratio is relatively small, which is not suitable for transmitting high torque. As a solution of such problems in spur gears, helical gears have been provided. These gears are for increasing the meshing ratio of the teeth to continuously cause tooth contact, but have a drawback in difficulty of processing.

On the other hand, planetary gear devices using planetary gears have been known as gear mechanisms by the aforementioned Patent Document 1 and the like, and these have been used as rotation speed reducing mechanisms in various speed reducers. The planetary gear devices are not generally formed with helical gears. Although some helical gears have slight helical angles not more than 20 degrees, it is difficult to mount these so that practicality is poor in the present situation. The reason is that insertion of planetary gears is difficult since the planetary gears exist in a manner sandwiched between an internal gear and a sun gear and the internal gear and the sun gear are different in the direction of helical angles. Consequently, spur gears are generally used for a planetary gear mechanism.

The planetary gear device is composed of an internal gear (ring gear), a sun gear, planetary gears, and retainers for retaining the planetary gears so as to be freely rotatable. Therefore, the mechanism as a whole can be used as a rotational bearing, however, this is freely displaced in the thrust direction since gear meshing is of spur gears and cannot therefore receive a thrust force. Consequently, in order to prevent the sun gear and planetary gears from being displaced in the thrust direction, a rotational bearing is often used.

Moreover, the planetary gear mechanisms have advanced remarkably, and currently, use of a planetary gear mechanism called a magical planetary gear mechanism has also started. This mechanism is different from the conventional planetary gear mechanisms in the point that the deceleration ratio can be considerably increased. This invention was made by Ferguson a long time ago, however, since there is a structure meshing spur gears with different tooth number ratios, this easily locks and can become inoperative as the case may be. Therefore, only with the meshing of the spur gears, a perfect operation cannot be assured, and since the deceleration ratio is large, friction loss of the teeth and influence of backlash increase, so that there is a problem such that a considerably high tooth form accuracy is required when it is formed with spur gears.

Representative of rotating bearing mechanisms include a ball bearing. This is a mechanism that couples an inner ring and an outer ring so as to be freely rotatable via balls and is a friction mechanism using a rolling friction of the balls. Also, included is a mechanism generally called a sliding bearing, which is freely rotatably coupled by a sliding friction of an interface between the inner and outer rings. The mechanism such as a ball bearing and a sliding bearing cause an increase in friction loss when being loaded. In addition, the bearings are inhibited from rolling due to deformation of the balls and suddenly increase in friction loss. In addition, generally employed is preloading for the purpose of reducing the backlash, and this contributes to promoting friction loss.

On the other hand, friction mechanisms exist even in the gear mechanisms. For example, a worm gear can be mentioned. This mechanism is a mechanism to carry out rotation transmission using friction although the gear shape is a screw shape. Therefore, similar to the above, there is a problem such that friction loss increases against a load from a thrust direction vertical to the rotation axis.

The present invention has been made to solve the aforementioned problems, and an object thereof is to provide a rotation transmission mechanism transmitting a force by meshing of gears with each other in place of a transmission mechanism by friction, the rotation transmission mechanism having extremely less backlash, capable of suppressing the rotating noise of gears, having a large loading resistance in the thrust direction, and capable of transmitting high torque.

Furthermore, it is an object to realize meshing of gears having large helical angles with each other, which could not have generally been constructed as a planetary gear mechanism in the present invention, by use of screw-like gears and thus providing a planetary gear device capable of smoothly rotating under a large thrust load and also capable of considerably reducing backlash in the rotating direction and the thrust direction without using a bearing device such as a ball bearing.

Moreover, it is an object to provide a gear mechanism and a planetary gear device that can be reduced in size as an identical torque transmission mechanism and can be manufactured at a low cost by using a gear mechanism that does not require a high processing accuracy.

Furthermore, it is an object to provide a rotating bearing device using a planetary gear device having a high loading resistance in the thrust direction and less friction loss.

Furthermore, it is an object to provide a magical planetary gear speed reducer having a high deceleration ratio and capable of smoothly transmitting rotation with a small rattling noise of gears.

Means for Solving the Problems

In order to achieve the aforementioned objects, a gear mechanism according to a first aspect of the present invention is a gear mechanism in which a plurality of spur gears are disposed in a meshed state with each other, wherein screw-like gears are disposed coaxially with the respective spur gears in a meshed state with each other, the meshed screw-like gears are formed in screw shapes having equal lead angles extending in reverse directions to each other and equal in screw pitch to each other, a ratio of effective screw diameters of the screw-like gears meshing with each other is equal to a ratio of tooth numbers of the spur gears meshing with each other, a ratio of screw thread numbers of the screw-like gears meshing with each other is equal to a ratio of reference pitch circle diameters of the screw-like gears, and the coaxial spur gear and screw-like gear are integrally rotated to transmit rotation to the adjacent spur gear and screw-like gear.

Here, in the aforementioned gear mechanism, as in a second aspect of the invention, it is preferable that the meshing between the screw-like gear and screw-like gear is by meshing without a gap between each other in a vicinity of the effective screw diameters parallel to rotation axes of the gears. In addition, as in a third aspect of the invention, the spur gears can be formed of helical gears having helical teeth.

Effects of the Invention

The gears used in the present gear mechanism are screw-like gears and spur gears, that is, gears having screw-shaped gear parts and spur gear parts, and these transmit rotation by meshing of the screw-shaped screw-like gears with each other and, likewise as for the spur gears, by meshing of the gears with each other. In order to prevent the screw-like gears from producing backlash in the thrust direction, it is necessary that the screws mesh without a gap between each other at reference pitch circle diameters being effective screw diameters thereof.

It is therefore required that the screw thread pitches are equal and the screw thread angles are equal. In addition, in order to prevent the screw-like gears from producing a thrust displacement from each other during rotation, it is required that these are equal in lead angle (equal in the tooth lead angle of the gear) and have reverse screw directions to each other, more specifically, have the lead angles in reverse directions to each other. Accordingly, the lead angles, that is, the screw directions are in reverse directions to each other, the pitches are equal, and a ratio of screw thread numbers is equal to a diameter ratio. Consequently, since the thread numbers can take only integers, a ratio of meshing effective diameters cannot take an arbitrary value, and the ratio of effective diameters multiplied by the ratio of screw thread numbers results in a ratio of integers.

For example, a small-diameter screw-like gear is provided as a left-hand screw having an effective screw diameter of ø5 mm and a screw thread number of 2. A large-diameter screw-like gear is provided as a left-hand screw having an effective screw diameter of ø7.5 mm and a screw thread number of 3.

In addition, for the spur gears, it is sufficient that these are equal in module and equal in pressure angle, and it is required that these mesh at reference pitch circle diameters equal to those in meshing of the screw-like gears. Thus a small-diameter spur gear part has a reference pitch circle diameter of ø5 mm and a tooth number of 10, and a large-diameter spur gear part has a reference pitch circle diameter of ø7.5 mm and a tooth number of 15.

Screw-like gears have generally been used for gear mechanisms using friction, for example, worm gears and the like, however, here, when screw-like gears are meshed with each other and the screws are viewed in a section around and vertical to the rotation axis, these can be handled as gears having tooth numbers equal to the screw thread numbers. Therefore, the mechanism is a transmission mechanism not by frictional transmission but by meshing of the gears, which smoothly rotates while receiving little influence of friction, so that a high transmission efficiency can be maintained.

DETAILED DESCRIPTION OF THE DRAWINGS

FIG. 1 A front view of a gear mechanism showing a first embodiment of the present invention.

Figure 2:
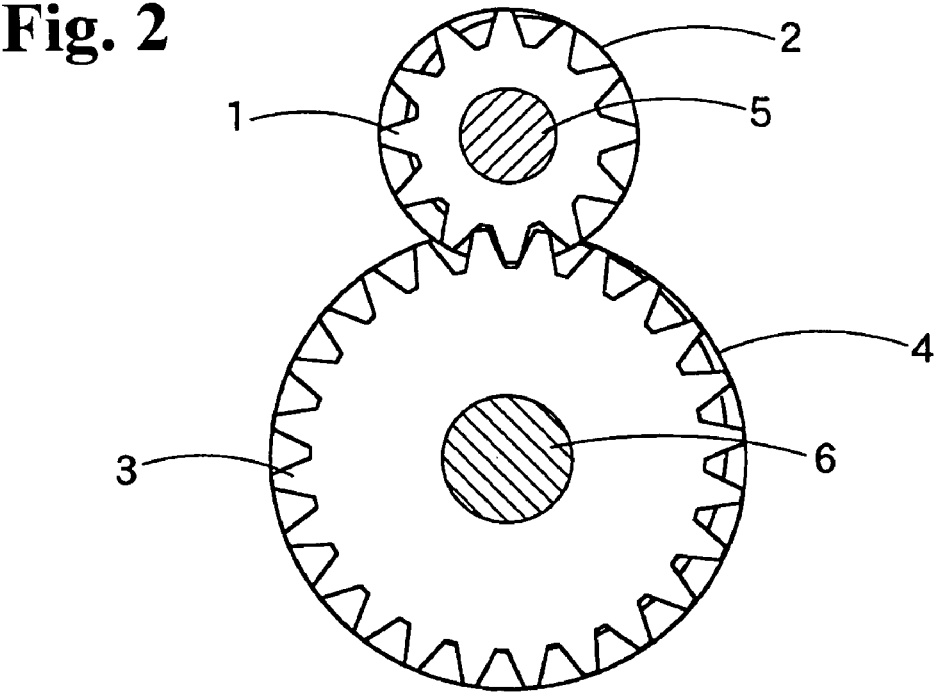

FIG. 2 A sectional view of the same gear mechanism.

Figure 3:
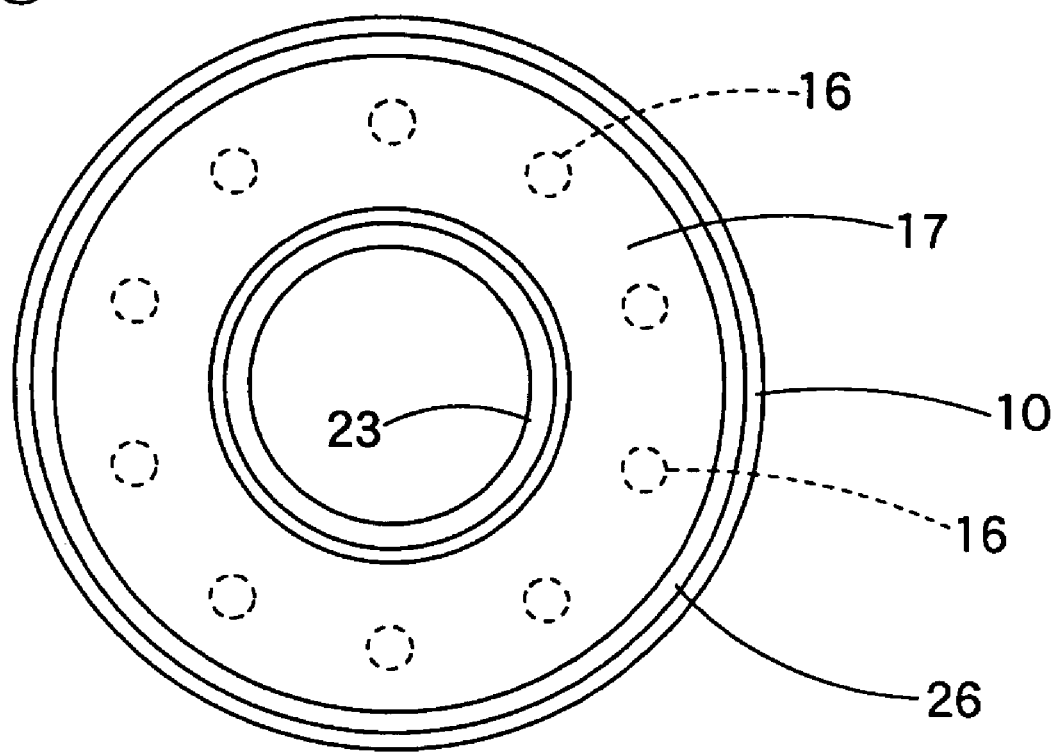

FIG. 3 A front view of a planetary gear device of a second embodiment.

Figure 4:
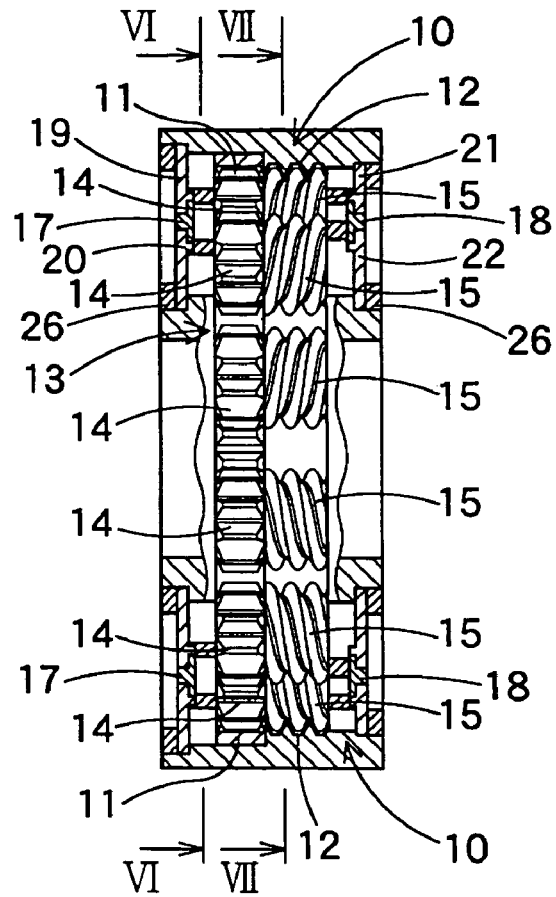

FIG. 4 A sectional view of an internal gear 10 of the same planetary gear device longitudinally sectioned at the center to reveal an appearance of planetary gears 13.

Figure 5:
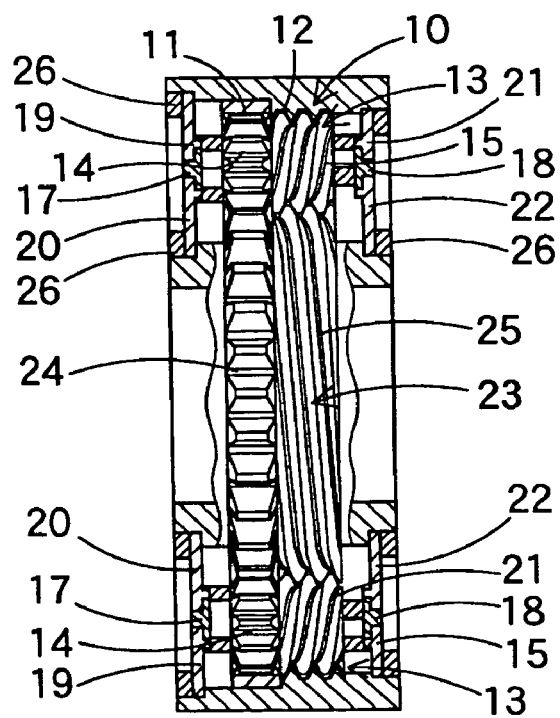

FIG. 5 A sectional view of an internal gear 10 of the same planetary gear device longitudinally sectioned at the center to reveal an appearance of planetary gears 13 and an appearance of a sun gear 23.

Figure 6:
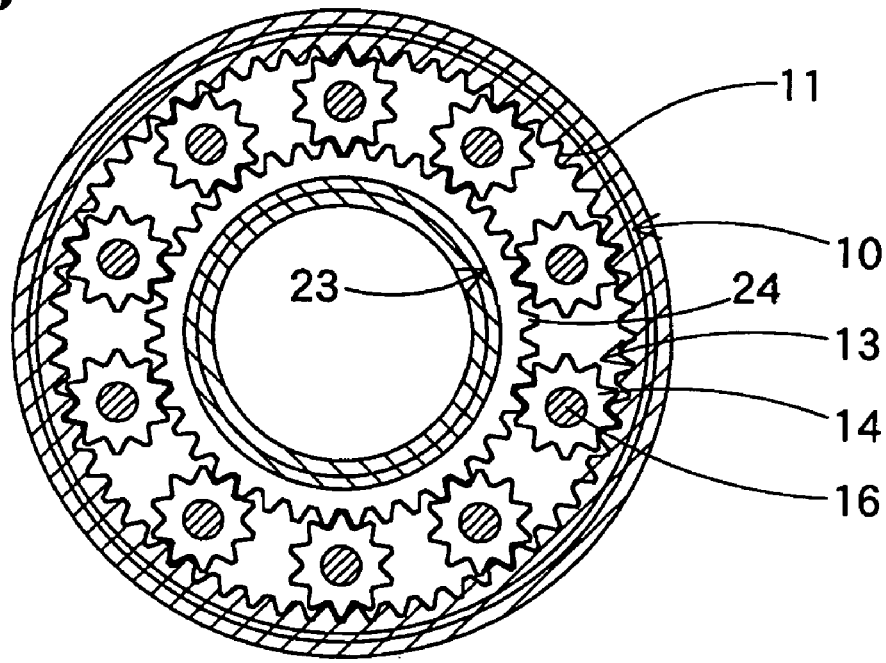

FIG. 6 A sectional view along a line VI-VI of FIG. 4.

Figure 7:
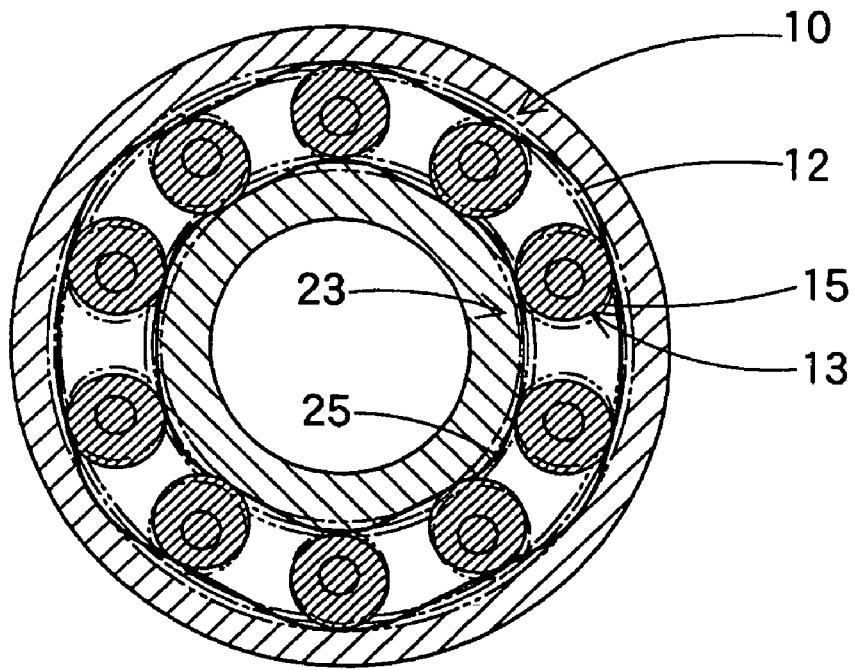

FIG. 7 A sectional view along a line VII-VII of FIG. 4.

Figure 8:
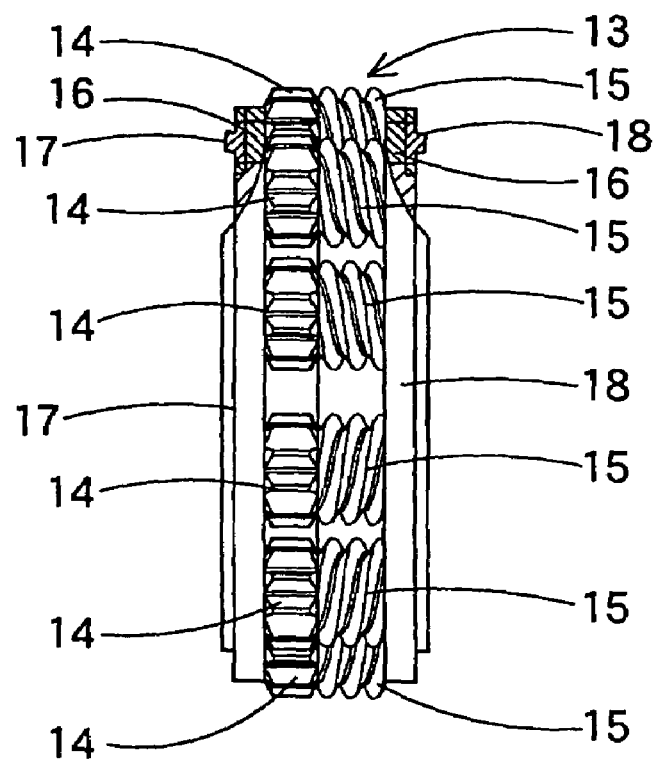

FIG. 8 A side view with partial sections of a mounted structure of planetary gears 13 and retainers 17 and 18.

Figure 9:
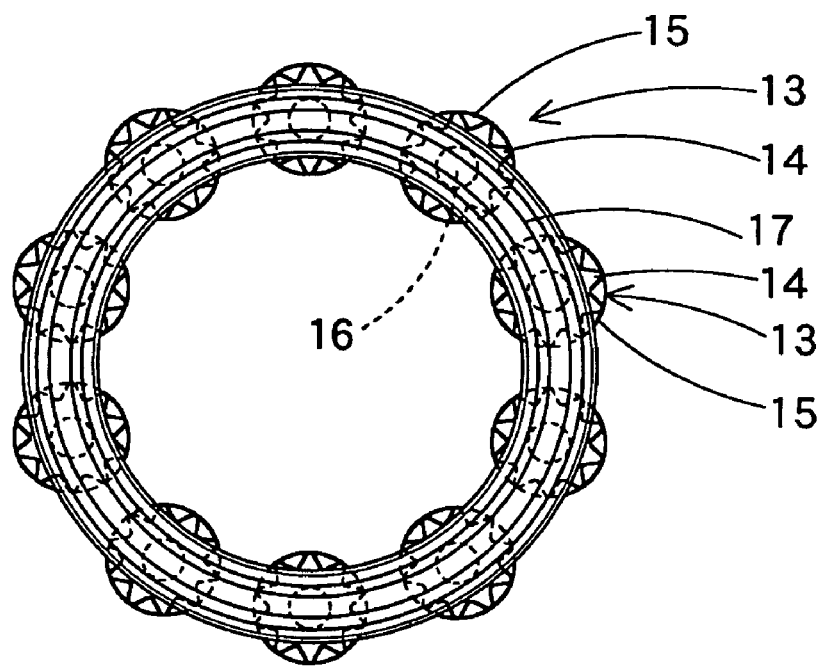

FIG. 9 A front view of the same mounted structure.

Figure 10:
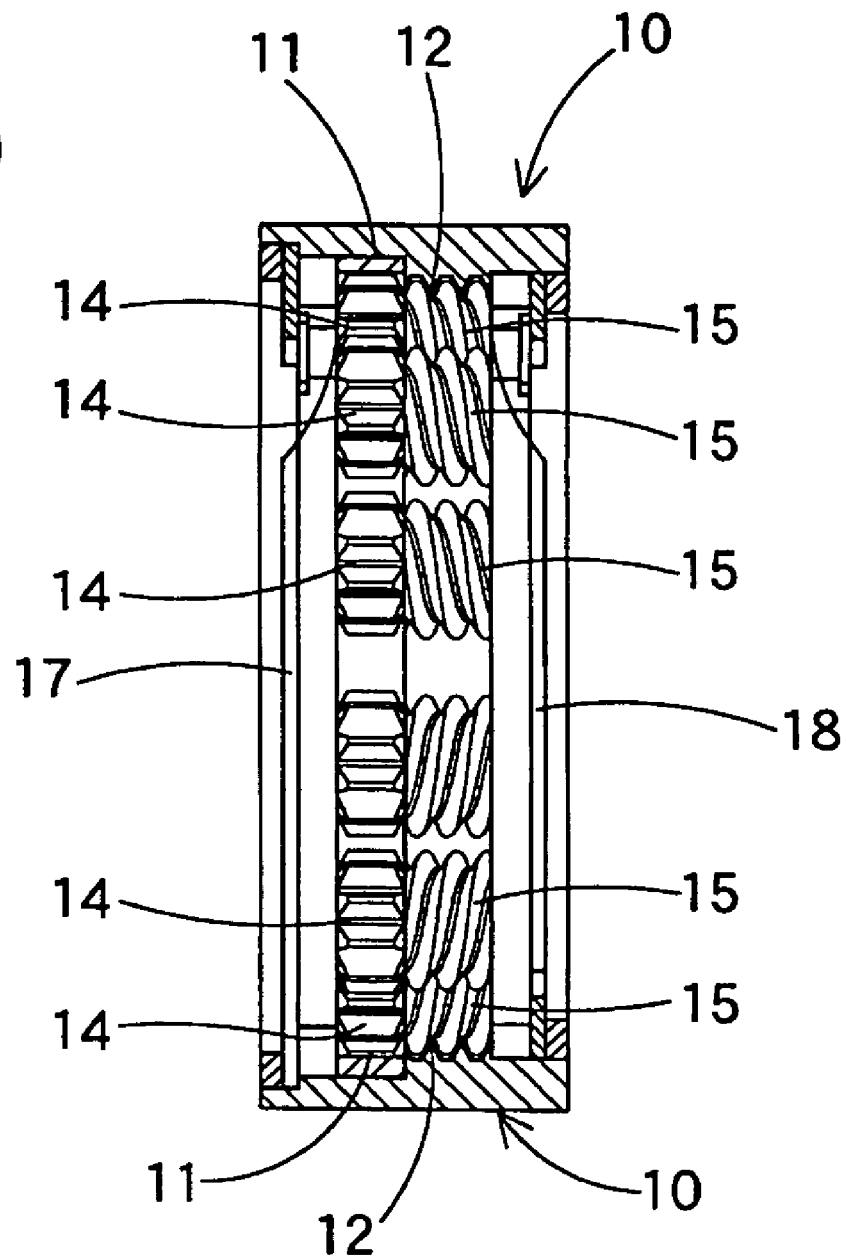

FIG. 10 A side view with partial sections of the same mounted structure inserted into an internal gear 10.

Figure 11A:
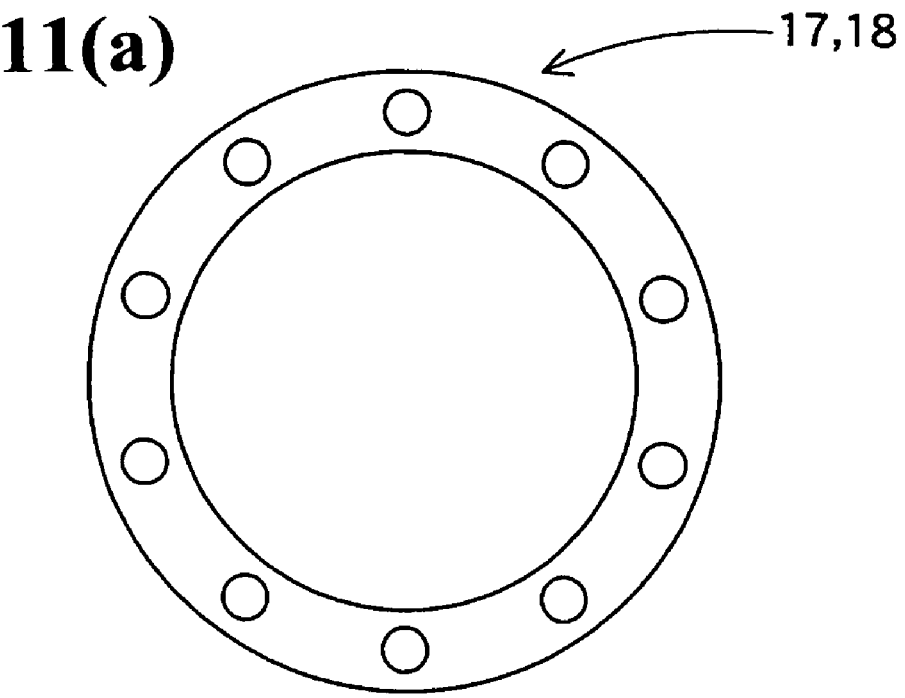
Figure 11B:
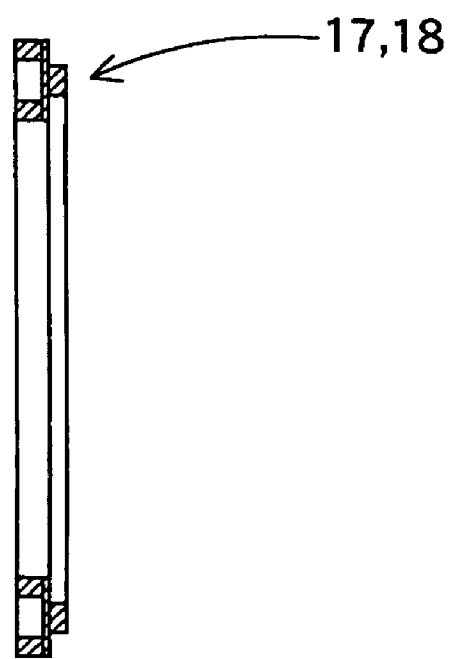

FIG. 11 A front view (a) of retainers 17 and 18 and a longitudinal sectional view (b) thereof.

Figure 12:
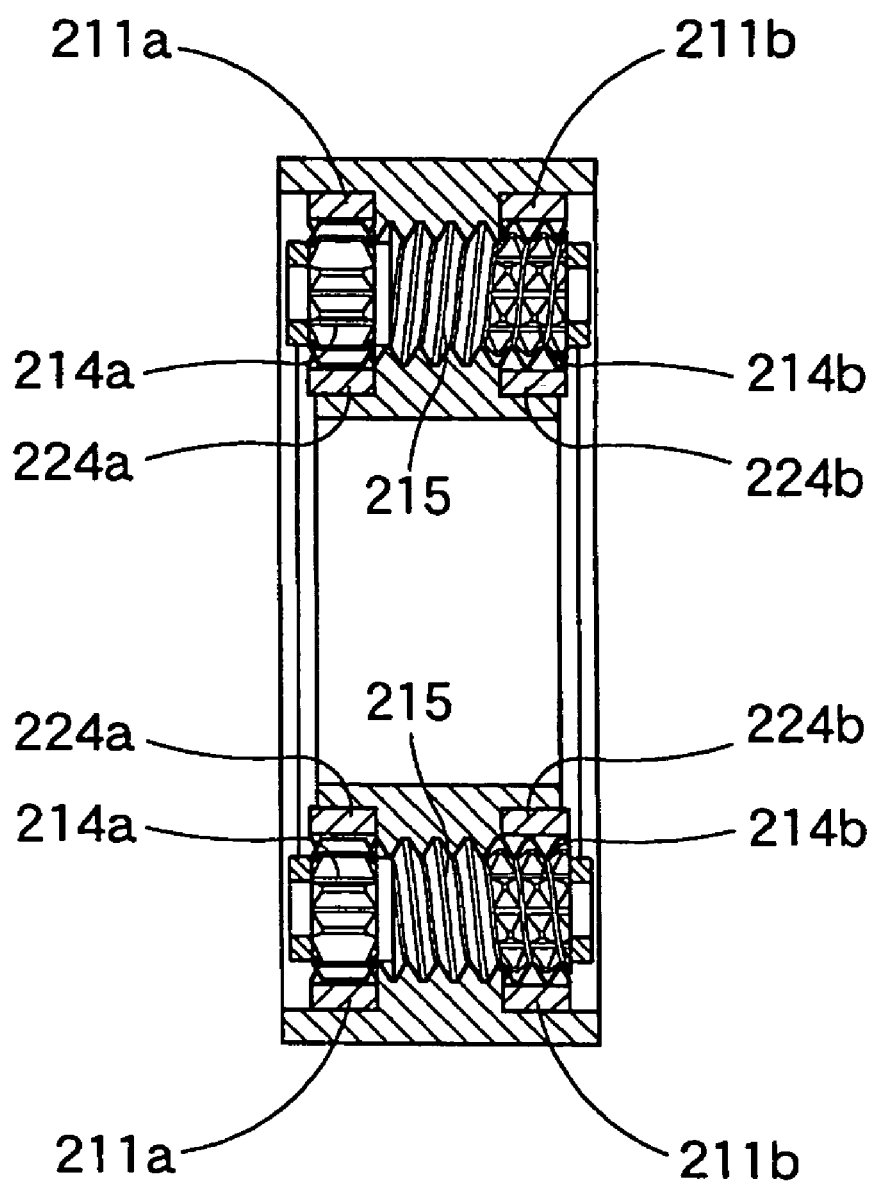

FIG. 12 A longitudinal sectional view of a planetary gear device of another embodiment.

Figure 13:
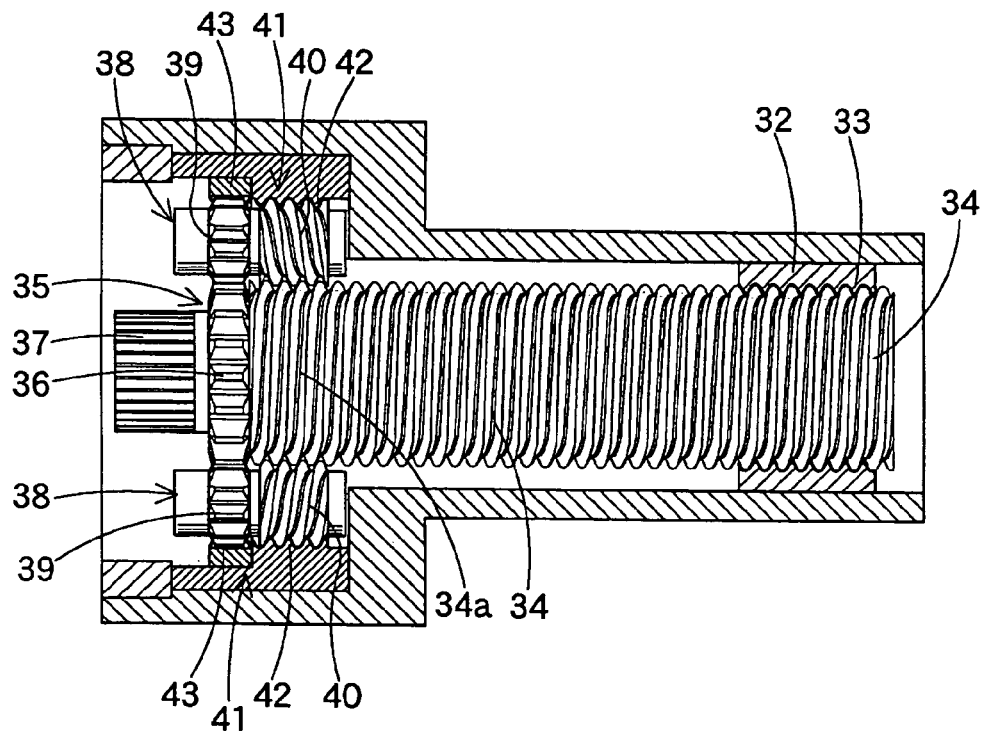

FIG. 13 A longitudinal sectional view of a rotating bearing device applied with a planetary gear device of a third embodiment.

Figure 14:
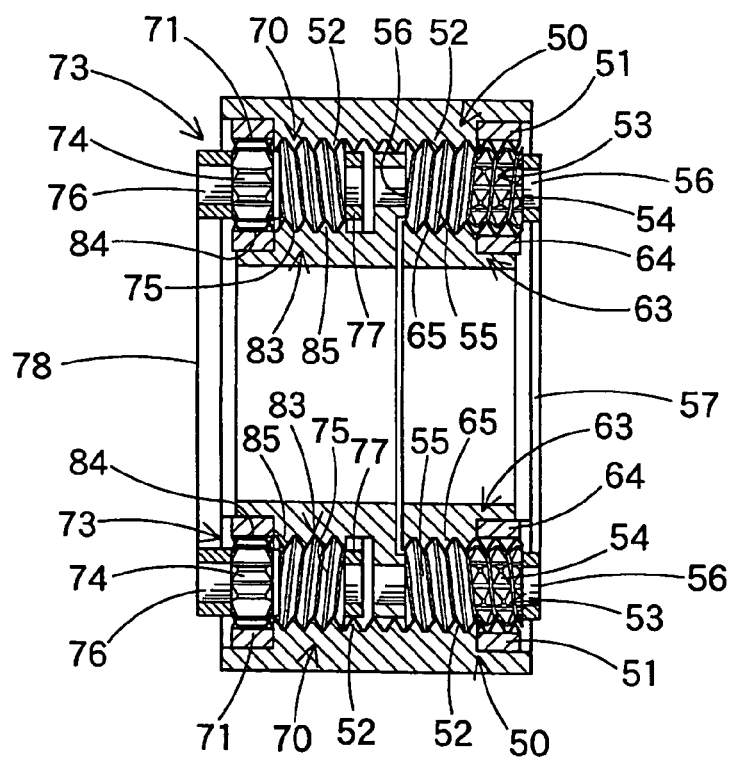

FIG. 14 A sectional view showing an appearance of planetary gears of a two-stage gear device of a fourth embodiment.

Figure 15:
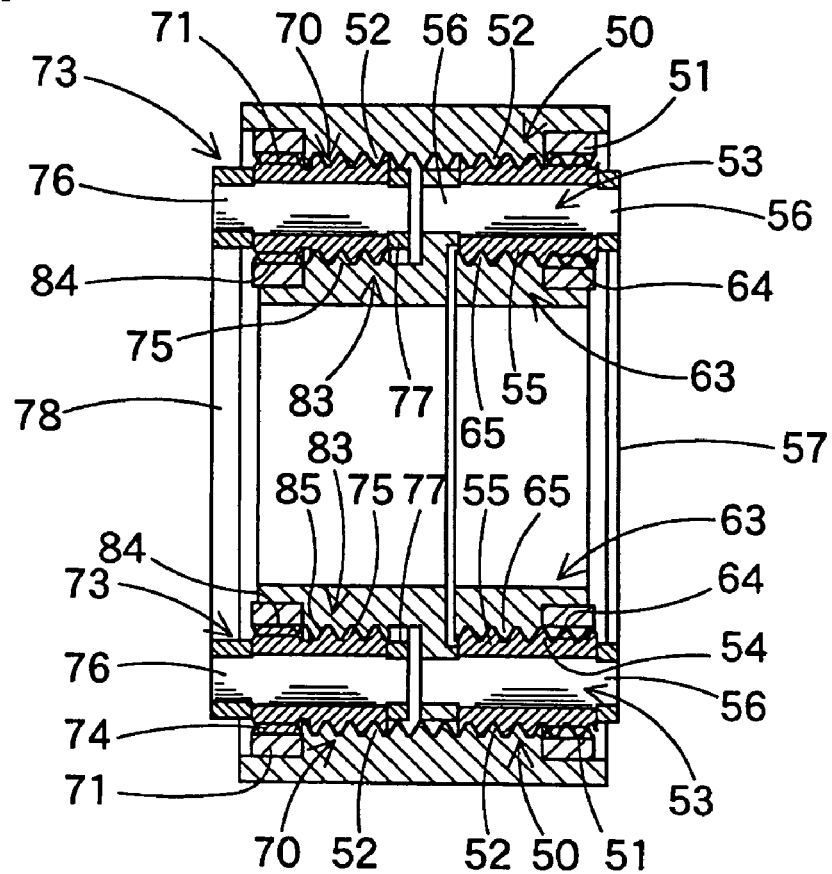

FIG. 15 A sectional view of a two-stage planetary gear device of a fourth embodiment.

Figure 16:
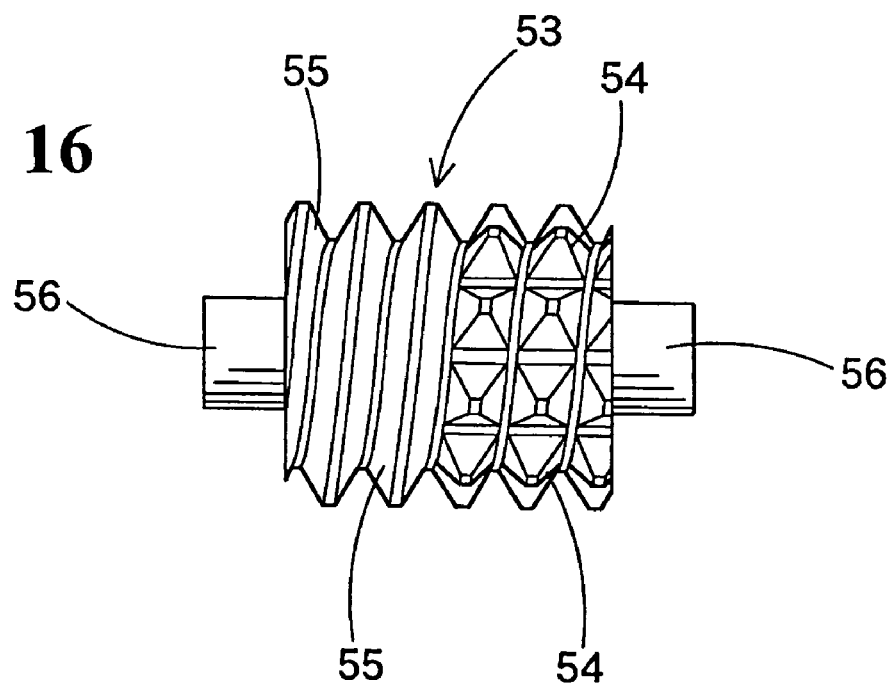

FIG. 16 A side view of a planetary gear 53.

Figure 17:
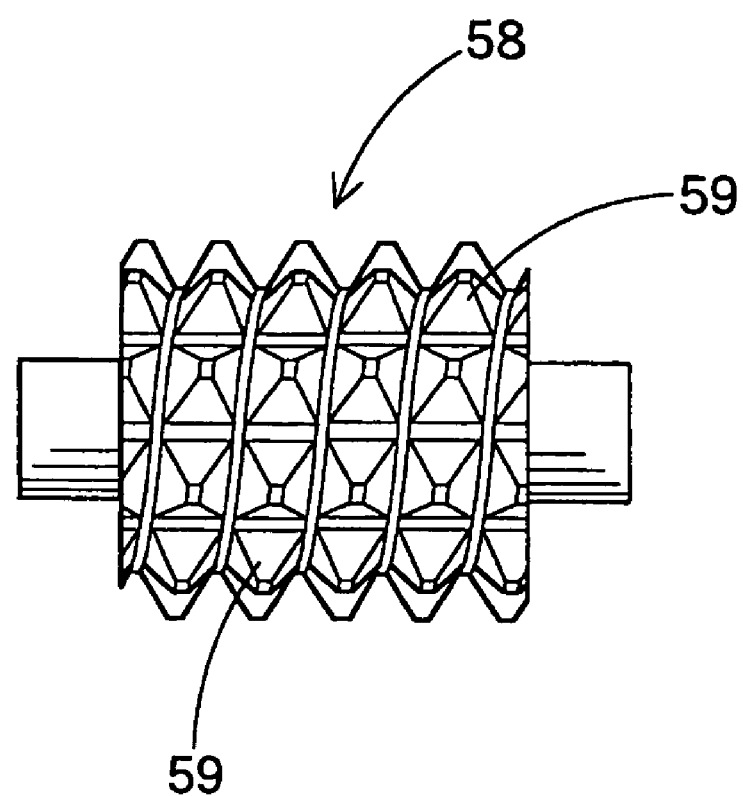

FIG. 17 A side view of a planetary gear 58.

Figure 18:
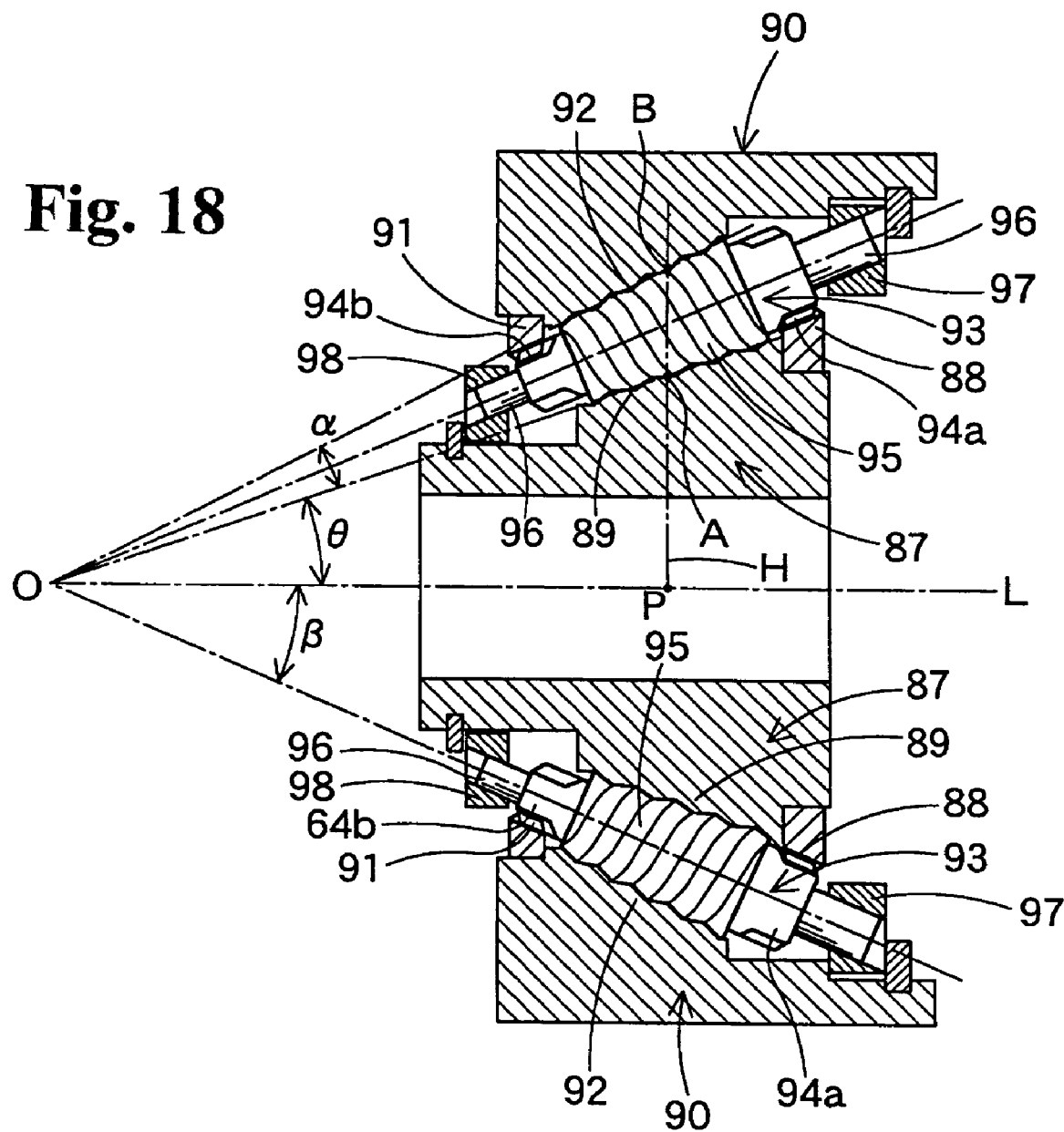

FIG. 18 A sectional view of a planetary gear device using inclined planetary gears of a fifth embodiment.

Figure 19:
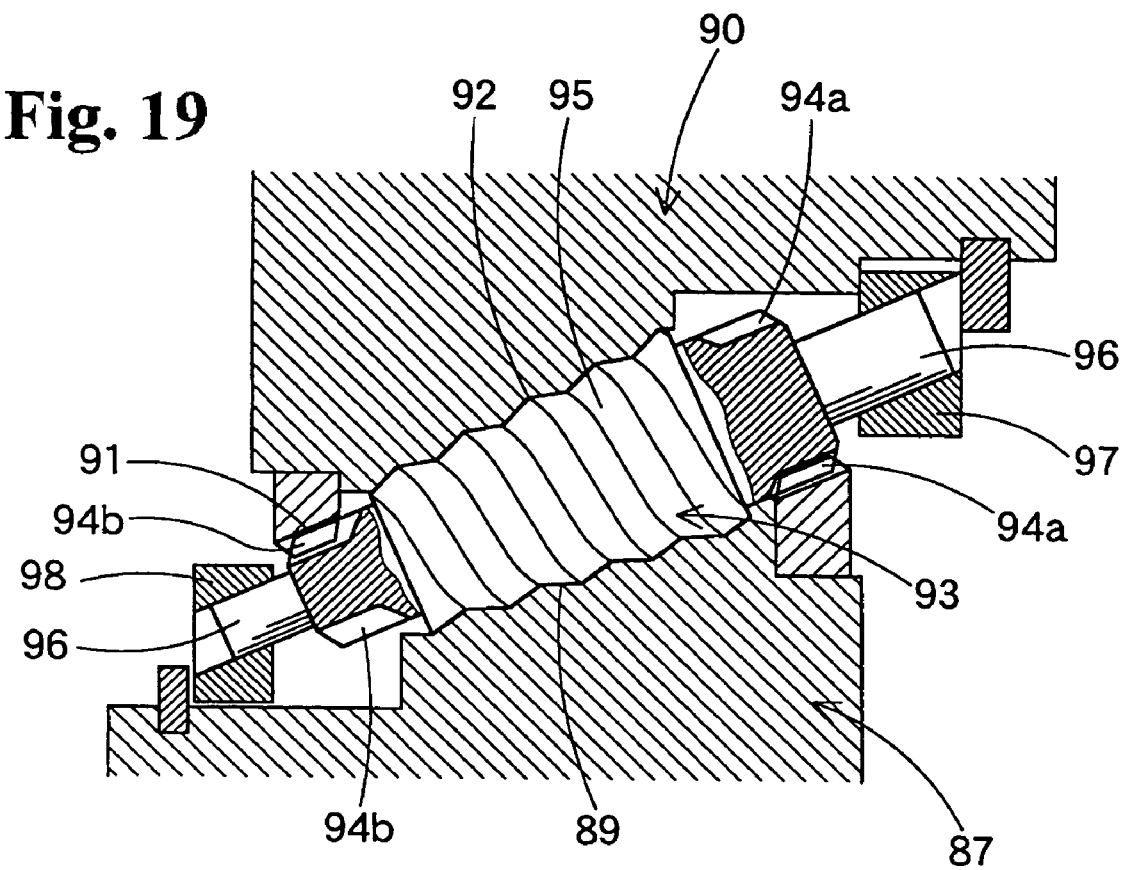

FIG. 19 A partially enlarged view of the same planetary gear device.

Figure 20A:
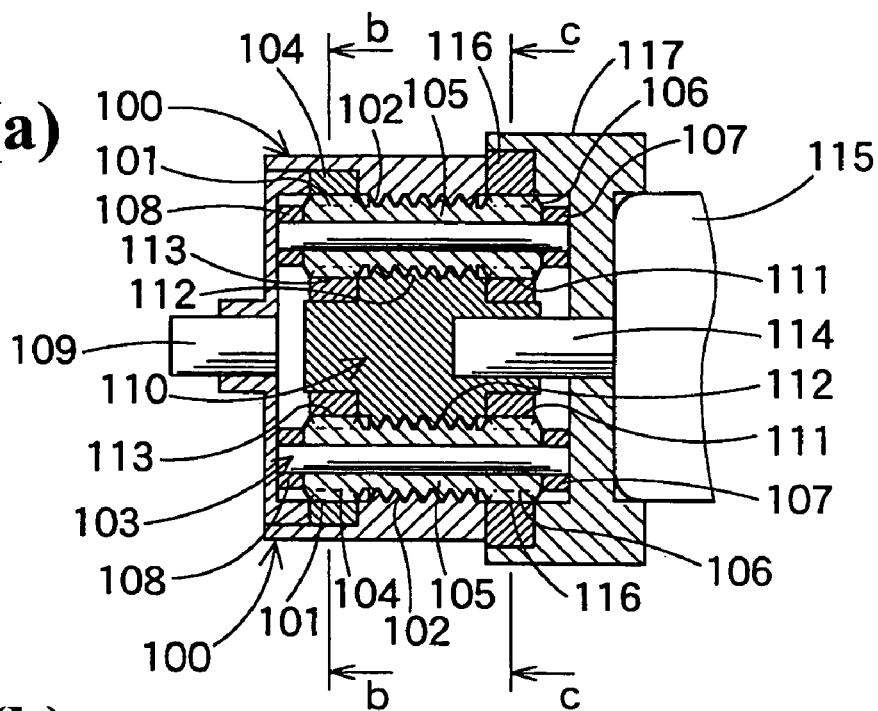
Figure 20B:
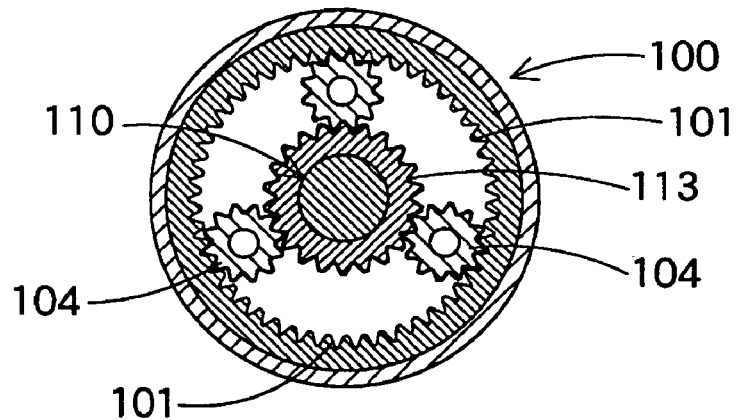
Figure 20C:
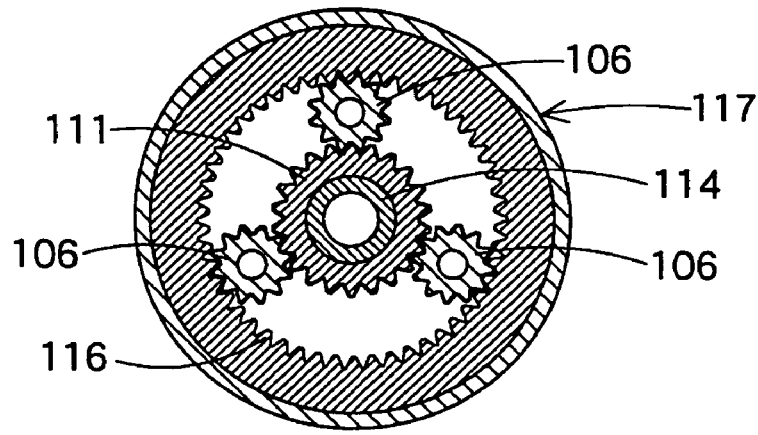

FIG. 20 Views showing a magical planetary gear speed reducing mechanism of a sixth embodiment, wherein (a) is a longitudinal sectional view thereof, (b) is a sectional view along a line b-b of the longitudinal sectional view (a), and (c) is a sectional view along a line c-c of the longitudinal sectional view (a).

Figure 21A:
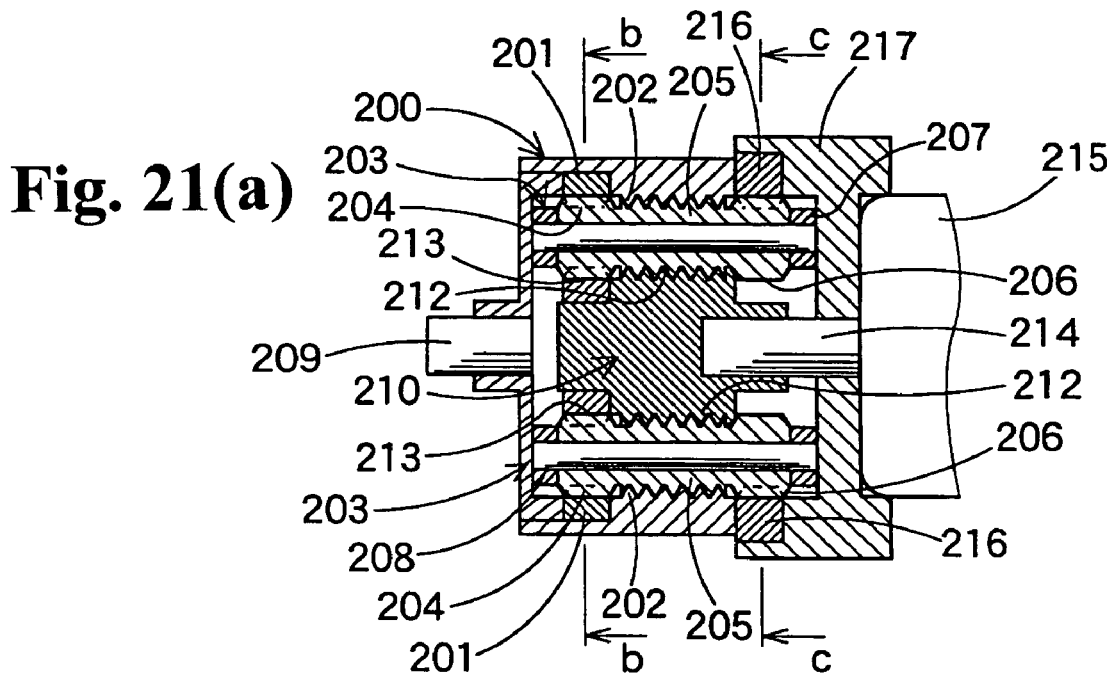
Figure 21B:
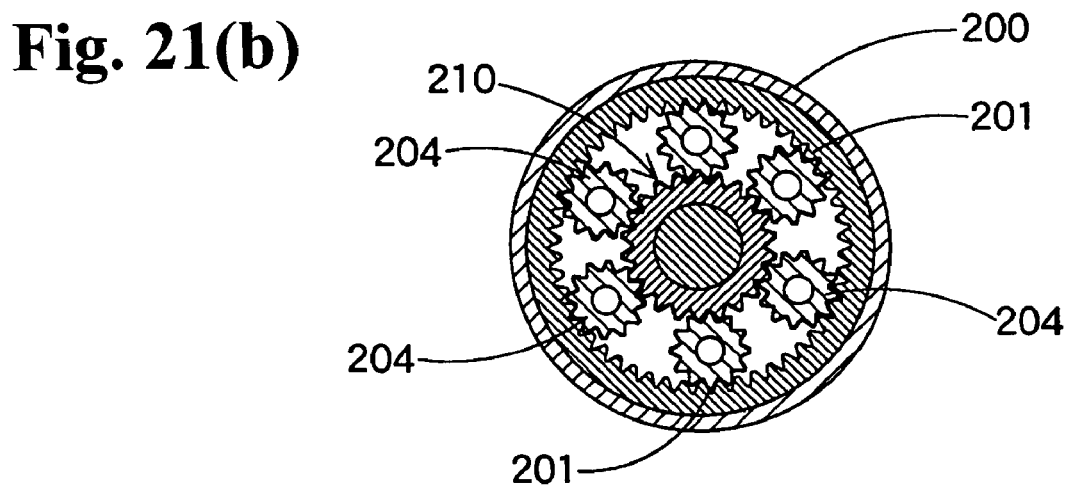
Figure 21C:
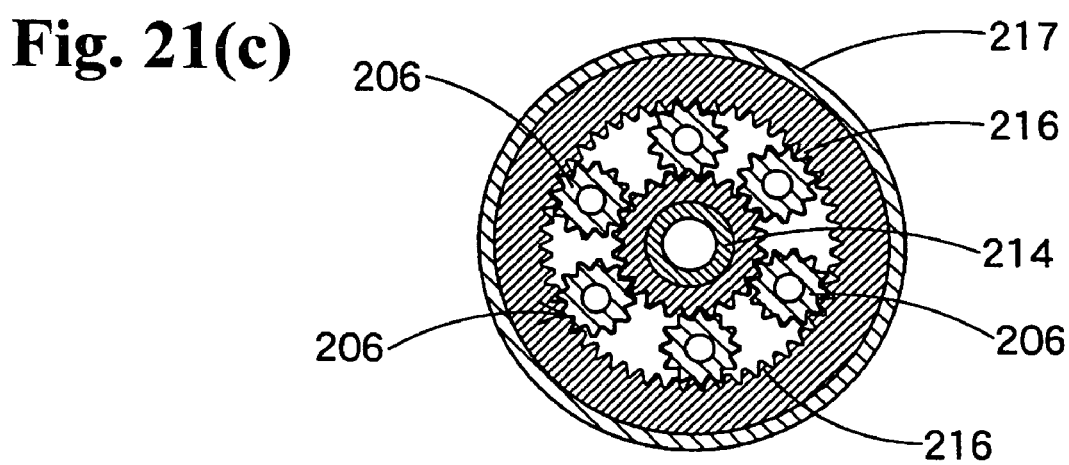

FIG. 21 Views showing a magical planetary gear speed reducing mechanism of a seventh embodiment, wherein (a) is a longitudinal sectional view thereof, (b) is a sectional view along a line b-b of the longitudinal sectional view (a), and (c) is a sectional view along a line c-c of the longitudinal sectional view (a).

DESCRIPTION OF REFERENCE NUMERALS

1 First spur gear
2 First screw-like gear
3 Second spur gear
4 Second screw-like gear
10 Internal gear
11 Internal spur gear
12 Female screw-like gear
13 Planetary gear
14 Planetary spur gear
15 Planetary screw-like gear
17, 18 Retainer
23 Sun gear
24 Sun spur gear
25 Sun screw-like gear

BEST MODE FOR CARRYING OUT THE INVENTION

Hereinafter, embodiments of the present invention will be described based on the drawings. FIG. 1 shows a front view of a gear mechanism of a first embodiment of the present invention, and FIG. 2 shows a sectional view thereof.

For the gear mechanism, as shown in FIGS. 1 and 2, a first spur gear 1 on a first rotation axis 5 and a second spur gear 3 on a second rotation axis 6 are displaced in a meshed state, and furthermore, a first screw-like gear 2 is provided on the first rotation axis 5, a second screw-like gear 4 is provided on the second rotation axis 6, and the first screw-like gear 2 and the second screw-like gear 4 are disposed in a meshed state with each other. The first screw-like gear 2 and the second screw-like gear 4 are formed in screw shapes having lead angles L1 and L2 (FIG. 1) extending in reverse directions to each other and equal in angle to each other, and the first spur gear 1 and the first screw-like gear 2 and the second spur gear 3 and the second screw-like gear 4 simultaneously rotate at an identical rotation speed.

Here, a ratio of effective screw diameters of the first screw-like gear 2 and the second screw-like gear 4 is 1:2, the number of threads of these screws are 2 and 4, and the first spur gear 1 and the second spur gear 3 are formed with the numbers of teeth of 10:2, which is identical in the ratio of the effective screw diameters. Screw portions of the first screw-like gear 2 and the second screw-like gear 4 can be called helical gears having large helical angles, however, as described later, these are different from conventional helical gears and are meshed at parts with the effective screw diameters without backlash in the thrust direction. In addition, as shown in FIG. 1, screws (male screws) of the first screw-like gear 2 and the second screw-like gear 4 have, as a result of gear cutting not in a normal system but in a radial system, screw shapes being in reverse directions where a screw pitch P1 of the first screw-like gear 2 and a screw pitch P2 of the second screw-like gear 4 are equal, and the lead angle L1 of the first screw-like gear 2 and the lead angle L2 of the second screw-like gear 4 are equal.

The screws of the first screw-like gear 2 and the second screw-like gear 4 (male screws) are devised so as to be meshed as involute gears having the same pressure angle on a plane sectioned vertically to a thrust shaft, and in other words, the meshed screw-like gears are formed, although having an identical thread angle, with the tooth surfaces being corrected by an involute function or the like so as to prevent interference.

Next, as a difference of the first screw-like gear 2 and the second screw-like gear 4 used in this gear mechanism from conventional-art helical gears, the first screw-like gear 2 and the second screw-like gear 4 cannot have arbitrary helical angles although the conventional helical gears could have arbitrary helical angles. That is, since the first screw-like gear 2 and the second screw-like gear 4 are equal in screw pitch and lead angle, the ratio of effective screw diameters of both is equal to the ratio of screw thread numbers (ratio of tooth numbers) of both, and the thread numbers are integers. Thus, the helical angles of the first screw-like gear 2 and the second screw-like gear 4 are determined based on the pitch, the effective screw diameters, and the thread numbers.

Furthermore, the conventional helical gears have backlash in the thrust direction and cause meshing only in the rotating direction. However, the first screw-like gear 2 and the second screw-like gear 4 are formed so as to mesh at the effective diameters (effective pitch circle diameters) of the screws in the thrust direction and also mesh in the rotating direction.

Since the screw-like gear and helical gear of two different tooth shapes are to mesh with an identical diameter, this may be considered impractical due to interference. However, meshing of these two gear shapes compensates for drawbacks of both and produces effects that cannot be achieved by the conventional art.

First, meshing of the screw-like gears with each other is continuously displaced in a helical form. Therefore, gear rattling does not occur, quiet transmission of rotation is possible, and loading resistance is large as the gears are tightly meshed in the thrust direction. In addition, the screw shapes can be easily processed by rolling, grinding or the like, so that these are advantages such that manufacturing thereof is easier than that of helical gears and the manufacturing cost is low.

However, ideally, the ratio of rotations of the screw-like gears is equal to a tooth number ratio being a thread number ratio. However, the meshing position of the screws delicately varies depending on looseness, inclination, and machining accuracy, and the ratio of meshing pitch circle diameters is slightly different from the tooth number ratio (thread number ratio) due to processing accuracy. Therefore, the ratio of rotations of the screw-like gears results in an actual meshing diameter ratio that is slightly different from the optimal ratio. In addition, an error of the difference is also converted to a force for shifting in the thrust direction, so that the gears are also displaced in the thrust direction.

Specifically, with only the meshing of the screw-like gears, the ratio of rotations cannot be accurately adjusted to the thread number ratio and a slight thrust displacement is involved. In addition, a change in the screw shapes owing to changes over time due to usage can also be considered, so that a predetermined ratio of rotations cannot be accurately and permanently maintained even when an optimal screw meshing is reached at an early stage.

Therefore, meshing of spur gears is simultaneously used. The numbers of the spur gears are equal in modules, that is, have a ratio of effective screw diameters. As a result of existence of this meshing, the ratio of rotations thereof is fixed at that of the tooth numbers. The meshing of spur gears does not have a ratio of rotations other than the ratio of tooth numbers.

Therefore, by the gears, the ratio of rotations is fixed, and the ratio of rotations of the screw-shaped gears is restricted by the tooth number ratio of the spur gears so as to follow the optimal screw thread number ratio. In other words, while producing a slight slip at the meshing position of the screw-like gears with each other, the gears operate while being corrected so that the diameters of the meshing pitch circles satisfy the tooth number ratio of the spur gears. Specifically, while taking advantage of the meshing of the screw-like gears such as a smooth rotation, a rotation transmission mechanism compensating for such a drawback that the ratio of rotations cannot be accurately determined and producing no thrust displacement can be realized.

The gear mechanism has a first feature in having a large loading resistance, by the screw-like gear teeth, against a force in the thrust direction. Specifically, by meshing of the screw-like gear teeth, the mechanism is provided with a large loading resistance in the thrust direction and in the rotating direction being a force transmitting direction. In addition, spur gears generally cause gear rattling and therefore have a large noise, however, by the screw portions of the screw-like gears having continuous meshing to assist rotation and the screw portions of the screw-like gears having large helical angles, a mechanism that carries out a smooth rotation and produces an extremely small noise can be realized. Furthermore, since the continuous meshing of the gears can be maintained in both the thrust direction and rotating direction, backlash of the gears can be virtually eliminated. Specifically, a gear mechanism having a small noise, capable of transmitting high torque, and having a loading resistance in the thrust direction and a position retaining function in the thrust direction can be realized.

As described above, the present gear mechanism is characterized by having a large loading resistance without backlash by meshing of screw teeth of the first screw-like gear 2 and the second screw-like gear 4 with each other against a force in the thrust direction of the first and second rotation axes 5 and 6. In addition, by meshing of the spur helical gear l and the second spur gear 3 with each other, the ratio of rotations in the rotating direction is restricted. Accordingly, no large load is applied to the first spur gear 1 and the second spur gear 3, and meshing of the first screw-like gear 2 and the second screw-like gear 4 with each other smoothly transmits rotation force. Furthermore, spur gears generally cause gear rattling and therefore have a large operational noise, however, according to the present gear mechanism, since the first screw-like gear 2 and the second screw-like gear 4 cause continuous meshing to assist rotation and the screws of the screw-like gears have large helical angles, the meshing ratio is large with a smooth rotation, and occurrence of an operational noise can be remarkably reduced.

Furthermore, backlash in the rotating direction that easily occurs only with the spur gears can be virtually eliminated by simultaneously using meshing of the first screw-like gear 2 and the second screw-like gear 4. In addition, a gear mechanism having a small operational noise, capable of transmitting high torque, and having a loading resistance in the thrust direction and a position retaining function in the thrust direction can be provided.

Moreover, the first spur gear 1 and the second spur gear 3 used in the aforementioned embodiment can also be constructed as helical gears having helical angles not more than approximately 20 degrees.

Second Embodiment

Next, a planetary gear device using the aforementioned gear mechanism will be described with reference to FIG. 3 to FIG. 11. The planetary gear device is, as shown in FIG. 3 to FIG. 11, a one-stage planetary gear mechanism and is basically composed of a sun gear 23 having a sun spur gear 24, an internal gear 10 having an internal spur gear 11, and planetary gears 13 having planetary spur gears 14 meshed between a sun spur gear 24 and the internal spur gear 11 of the sun gear 23 and the internal gear 10.

And, the sun gear 23 is coaxially fitted with a sun screw-like gear 25 rotating integrally with the sun spur gear 24, the internal gear 10 is coaxially fitted with a female screw-like gear 12 rotating integrally with the internal spur gear 11, and the planetary gear 15 is coaxially fitted with a planetary screw-like gear 13 rotating integrally with the internal spur gear 14. The sun spur gear 24 of the sun gear 23 is manufactured separately from the body of the sun gear in consideration of assembly in manufacturing and is formed so as to be attached by fitting to the body of the sun gear at the time of assembly of the gear mechanism. In addition, the internal spur gear 11 of the internal gear 10 is also manufactured separately from the body of the internal gear in consideration of assembly in manufacturing and is formed so as to be attached by fitting to the body portion of the internal gear 10 at the time of assembly of the gear mechanism.

The sun screw-like gear 25 and the planetary screw-like gear 15 are formed in screw shapes being in reverse directions to each other, equal in lead angle, and equal in screw pitch and are meshed with each other. In addition, the female screw-like gear 12 of the internal gear 10 and the planetary screw-like gear 15 have a relationship of a female screw and a male screw being in an identical direction, are formed in screw shapes equal in lead angle and equal in screw pitch to each other and are meshed with each other. In addition, the planetary spur gear 14 is meshed with the sun spur gear 24 and is also meshed with the internal spur gear 11, and a ratio of effective screw diameters (diameters) of the sun screw-like gear 25 and the planetary screw-like gear 15 meshing with each other is coincident with a ratio of the screw thread numbers of the sun screw-like gear 25 and the planetary screw-like gear 15. Furthermore, a ratio of effective screw diameters of the female screw-like gear 12 and the planetary screw-like gear 15 meshing with each other is coincident with a ratio of the screw thread numbers of the female screw-like gear 12 and the planetary screw-like gear 15.

As the planetary gear 13, a plurality of planetary gears are disposed on an outer circumference of the sun gear 23 in a meshed state, however, the arranging number thereof is, as described later, limited by the thread number of the female screw-like gear 12 and the thread number of the sun screw-like gear 25, and here, ten planetary gears are disposed. A planetary shaft 16 of each planetary gear 13 is freely rotatably supported at both end portions thereof by bearing holes provided in annular retainer 17 and 18 shown in FIG. 11 and is, as shown in FIGS. 6 and 7, revolvable with rotation around the sun gear 23. Outside the retainer 17 and 18 freely rotatably retaining the ten planetary gears 13, seal rings 19, 20, 21, and 22 are freely rotatably fitted in a manner fitting ring-like protrusions into circumferential grooves provided outside the retainers 17 and 18 and thus providing a dust-proof seal for the interior of the gear mechanism. These seal rings 19 to 22 are freely rotatably retained by a ring 26 fitted outside the body of the internal gear 10 and fitted outside the body of the sun gear 23.

The present planetary gear device basically has, similar to the conventional planetary gear device, a function to decelerate or accelerate rotation, fixes any of the sun gear 23, the retainers 17 and 18 containing the planetary gears 13, and the internal gear 10, and makes unfixed gears rotatable together with the planetary gears 13. Alternatively, revolution of the retainers 17 and 18 containing the planetary gears 13 is stopped, and the sun gear 23 and the internal gear 10 are made rotatable for use. The deceleration ratio or the acceleration ratio at that time is determined based on the tooth numbers of the sun gear 23, the planetary gears 13, and the internal gear 10.

Furthermore, in the present planetary gear device, as shown in FIGS. 4 and 5, the sun screw-like gear 25, the planetary screw-like gears 15, and the female screw-like gear 12 are disposed while being accurately meshed with each other without a gap in the thrust direction vertical to the axis. In addition, as shown in FIG. 6, the sun gear 23 has the 40-tooth sun spur gear 24, the planetary gear 13 has the 10-tooth planetary spur gear 14, and the internal gear 10 has the 60-tooth internal spur gear 11. The sun spur gear 24 and the planetary spur gear 14, and the planetary spur gear 14 and the internal spur gear 11 are meshed similar to spur gears of a common planetary gear device.

Meanwhile, in the present planetary gear device, unlike the conventional planetary gear device, the number of the planetary gears 13 that can be arranged is restricted by the screw thread numbers and tooth numbers of the sun screw-like gear 25, the planetary screw-like gear 15, and the female screw-like gear 12.

To describe the fact in the following, in the conventional planetary gear device, where the diameter of a reference pitch circle of a sun gear is ø20 mm and the diameter of a reference pitch circle of a planetary gear thereof is ø20 mm, the diameter of a reference pitch circle of an internal gear thereof is inevitably ø40 mm. Therefore, where the module of an arbitrarily selected gear is 1, the tooth numbers of the sun gear, the planetary gear, and the internal gear are 20, 10, and 40, respectively. Accordingly, the number of planetary gears that can be arranged is 10, which is the greatest common divisor of the tooth numbers of the sun gear, the planetary gear, and the internal gear. However, in a common planetary gear device, there is not enough room to arrange as many as 10 planetary gears, and usually, five planetary gears as many as the number of the divisor of 10 can be arranged.

However, in the case of the present planetary gear device, an unconditional number of planetary gears cannot be arranged. For example, where the planetary screw-like gear is a single threaded screw, the ratio of the thread numbers of the sun screw-like gear and the female screw-like gear is equal to a ratio of effective screw diameters (equal to the reference pitch circle diameters) thereof, and the sun screw-like gear is a double reverse threaded screw, and the female screw-like gear is a 4-threaded female screw. With regard to the planetary gear having a planetary screw-like gear, since the sun screw-like gear and the female screw-like gear are of screws being in reverse directions and the planetary gears sandwiched between the sun gear and internal gear are restricted by the phases of screw threads of both, the number thereof that can be arranged are virtually determined.

That is, the arranging number of the planetary gears of the present planetary gear device is determined by a sum of the screw thread numbers of the sun screw-like gear and the female screw-like gear or a divisor thereof. Therefore, the tooth numbers of the sun spur gear, the internal spur gear, and the planetary spur gear are determined so that the arranging number of the planetary gears is equal to the greatest common divisor. More specifically, similar to the illustration of the conventional planetary gear device, where the diameter of a reference pitch circle of a sun gear is ø20 mm, the diameter of a reference pitch circle of a planetary gear is ø10 mm, and the diameter of a reference pitch circle of an internal gear is inevitably ø40 mm, the number of planetary gears that can be arranged is six, which is a sum of the screw thread numbers of the sun screw-like gear and the female screw-like gear, and a combination of teeth taking a common multiple of the number 6 is provided. Thus, the tooth numbers of the sun spur gear, the internal spur gear, and the planetary spur gear can have a combination of the tooth numbers such as, for example, 12, 6, and 24 or 24, 12, and 48, respectively.

In the present example, the effective screw diameter ratio is provided as a ratio of 4:1:6 for the sun gear, the planetary gear, and the internal gear, respectively, and the thread numbers of the screws are also provided as 4, 1, and 6. Therefore, the arranging number of the planetary gears is 10 at maximum, and 10 is selected in the present example. Accordingly, a combination of the spur gear tooth numbers taking 10 as the greatest common divisor is selected, and the tooth numbers of the sun spur gear, the internal spur gear, and the planetary spur gear are provided as 40, 10, and 60, respectively.

A method for mounting the respective gears when manufacturing a planetary gear device constructed as in the above will be described. Since the conventional planetary gear device is composed of spur gears, those spur gears can be relatively easily mounted by fitting those in the axial direction. However, in the present planetary gear device, since the screw-like gears and female screw-like gear in screw shapes are used, these cannot be simply mounted as in the common case of only spur gears, so that it is important for realizing the present invention to construct the planetary gear device so as to be assembleable.

Consequently, in the present planetary gear device, as in the above, the sun spur gear 24 of the sun gear 23 is formed separately from the body of the sun gear 23, and the internal spur gear 11 of the internal gear 10 is formed separately from the body of the internal gear 10, and these are mounted after completion of mounting by meshing of the screw-like gears and female screw-like gear. Furthermore, as described in detail in the following, first, the planetary gears 13 are mounted on the retainers 17 and 18, and next, the planetary gears 13 are inserted between the internal gear 10 and the sun gear 23 by producing a thrust displacement with rotation and are assembled while causing the same to produce a slight slip. That is, the screw-like gears and female screw-like gear do not mesh at accurate reference pitch circles due to processing accuracy and the like. For this reason, when the screw-like gears are rotated in a meshed state, a slight thrust displacement occurs. In addition, since a slight slip occurs in contact between screws, these are used for assembly of the planetary gear device.

More specifically, when the present planetary gear device is assembled, first, all planetary gears 13 are freely rotatably attached with a small gap in the thrust direction between the two retainers 17 and 18 so as to form a subassembly. For attaching the planetary gears 13 to the retainers 17 and 18, there are two methods illustrated in the following. One is a method for retaining planetary gears by providing projections at both ends of a planetary gear shaft, inserting the projections into holes provided in plate-like retainers, and coupling the retainers by a separate column (planetary shaft), and the other is a method for attaching planetary gears by providing a hole at the center position of each planetary gear, inserting a column (planetary shaft) into the hole, and making the column also serve as a coupling part of retainers provided on both sides thereof.

Here, the latter method is employed, and as shown in FIGS. 8 and 9, first, the ten planetary gears 13 are arranged in a circumferential form in a manner sandwiched by the annular retainers 17 and 18, the columns (planetary shafts 16) are inserted into the planetary gears 13, and the planetary shafts 16 are fitted into the retainers 17 and 18, whereby the respective planetary gears 13 are mounted. Here, the inside diameter of the annular retainers 17 and 18 is formed greater than the diameter of the screw thread of the sun screw-like gear 25 so that the sun screw-like gear 25 of the sun gear 23 can be inserted thereinto and smaller than the diameter of the screw thread of the female screw-like gear 12 so as to be insertable into the female screw-like gear 12 of the internal gear 10. In addition, the inside diameter of the retainers 17 and 18 is formed greater than the diameter of an addendum circle of the sun spur gear 24, and the outside diameter thereof is formed smaller than the diameter of an addendum circle of the internal spur gear 11 of the internal gear 10.

Next, the subassembly of the planetary gears 13 and the retainers 17 and 18 shown in FIGS. 8 and 9 is inserted inside the internal gear 10 as in FIG. 10. As shown in FIG. 10, the subassembly of the ten planetary gears 13 and the retainers 17 and 18 is mounted on the inside of the internal gear 10. At this time, in order to prevent a thrust displacement of the planetary gears 13 and the like, the internal spur gear 11 of the internal gear 10 is inserted so as to mesh with the planetary spur gears 14 of the planetary gears 13, and the planetary screw-like gears 15 of the planetary gears 13 are inserted into the female screw-like gear 12 of the internal gear 10 so as to be meshed. In addition, for dust proofing of the interior of the internal gear 10 and preventing lubricant from scattering, the seal rings 19, 20, 21, and 22 are freely rotatably fitted outside the retainers 17 and 18 on both sides, and the ring 26 is attached by fitting in the internal gear 10 provided further outside the retainers 17 and 18.

As in the above, when the subassembly of the planetary gears 13 and the retainers 17 and 18 is inserted into the internal gear 10, in a condition where the internal spur gear 11 of the internal gear 10 is detached, the planetary screw-like gears 15 of the ten planetary gears 13 are meshed with the female screw-like gear 12 of the internal gear 10, and a rotary motion is given to the retainers 17 and 18. Then, the planetary gears 13 are, although little by little, inserted with rotation into the female screw-like gear 12 of the internal gear 10. This is because the female screw-like gear 12 of the internal gear 10 and the planetary screw-like gear 15 are in a relationship of a male screw and a female screw having an identical lead angle and are in such a screw relationship that the ratio of the effective screw diameters of the planetary screw-like gear 15 and the female screw-like gear 12 and the ratio of the thread numbers of the planetary screw-like gear 15 and the female screw-like gear 12 are identical, and thus, when a relative rotation is given between the female screw-like gear 12 of the internal gear 10 and the planetary screw-like gear 15, a slip occurs between the screw portions, whereby the planetary screw-like gears 15 are gradually inserted into the nut-shaped female screw-like gear 12 of the internal gear 10. When the planetary gears 13 and the internal gear 10 have reached a fixed position, the internal spur gear 11 is inserted into the internal gear 10 so as to mesh the internal spur gear 11 with the planetary spur gears 14 of the planetary gears 13 and fixed. Thus, a thrust displacement of the planetary gears 13 stops, and all planetary gears 13 are fitted in the internal gear 10 in a state where these are freely rotatable and are not displaced in the thrust direction.

Next, the internal gear 10 and the subassembly of the planetary gears 13 and the retainers 17 and 18 mounted as in FIG. 10 are inserted with rotation inside the sun gear 23 from which the sun spur gear 24 has been detached. The sun screw-like gear 25 of the sun gear 23 and the planetary screw-like gear 15 have meshing of male screws with each other being in a relationship of screws being in reverse directions having an identical lead angle. However, owing to a slight processing error of the lead angle, an error of the meshing diameter due to an inclination of the planetary gears in the radial direction and the circumferential direction, and the like, the ratio of the meshing pitch circle diameters (effective screw diameters) between the sun screw-like gear 25 and the planetary screw-like gear 15 has a slight error from a correct design value.

Nevertheless, when the sun gear 23 is rotated while meshing the sun screw-like gear 25 with the planetary screw-like gears 15, the planetary screw-like gears 15 are gradually screwed with a slight displacement in the thrust direction. And, when the sun gear 23 has been inserted up to the fixed position, the planetary spur gear 24 is inserted into the sun gear 23 so as to mesh the same with the planetary spur gears 14 and fixed by press fitting. In this state, no thrust displacement is produced between the sun gear 23 and the planetary gear 13, and the planetary gears 13 reach a state where these are revolvable with rotation around the sun gear 23.

Then, as shown in FIG. 4, for dust proofing and filling lubricant, the seal rings 19, 20, 21, and 22 are rotatably fitted outside the retainers 17 and 18, the rings 26 are press-fitted in outer edge portions of the internal gear 10 and the sun gear 23 and fixed, and thus a planetary gear device is completed. In the above, the planetary gears 13 have been first fitted to the internal gear 10, however, it is also possible to first fit the planetary gears 13 in the sun gear 23, and then mount the same in the internal gear 10.

As such, according to the planetary gear device constructed as in the above, the planetary screw-like gears 15, the female screw-like gear 12, and the sun screw-like gears 25 of the planetary gears 13, the internal gear 10, and the sun gear 23 mesh with each other, and only with the meshing of the screw-shaped gears, the planetary gear device rotates while preventing a shift in the thrust direction, therefore, backlash that easily occurs in a planetary gear device composed only of spur gears hardly occurs, and the planetary gear device can satisfactorily rotate, even under a load in the thrust direction, while retaining the thrust load.

Normally, when the rotation axis of a gear mechanism receive a load in the thrust direction, a special ball bearing, such as an angular bearing, capable of receiving a thrust load is required as the bearing, however, according to the present planetary gear device, since the planetary screw-like gears 15, the female screw-like gear 12, and the sun screw-like gears 25 rotate while meshing with each other, a thrust load can be received between the screw-like gears and female screw-like gear, so that no special bearing is required, and a gear mechanism having resistance against the thrust load can be formed without a special bearing. In addition, since no bearing is required, the planetary gear device can be reduced in size by space for attaching the same, and the manufacturing cost can be reduced.

Furthermore, according to the present planetary gear device, since rotational torque is transmitted by meshing by continuous tooth contact of the screw-like gears, it is possible, in comparison with the conventional similar-sized planetary gear device, to transmit a high rotational torque, and thus rotation transmission efficiency can be improved. In addition, when a gear mechanism transmitting an identical torque is assumed, since the present planetary gear device is higher in the transmission capability and strength of the teeth themselves than the conventional gear mechanism, the device can be composed of small-sized gears, and the planetary gear device as a whole can be reduced in size.

Furthermore, in the present planetary gear device, a noise produced by the gears during rotation is considerably reduced from that in the conventional art, so that a low-noise gear mechanism can be provided. That is, normally, in the conventional planetary gear device using spur gears, since the spur gears produce a rattling noise during rotation, a relatively large noise occurs. However, in the present planetary gear device, despite using the internal spur gear 11, the planetary spur gear 14, and the sun spur gear 24, transmission of a rotational torque is carried out mainly by meshing of the planetary screw-like gears 15, the female screw-like gear 12, and the sun screw-like gear 25 with each other, the internal spur gear 11, the planetary spur gears 14, and the sun spur gear 24 operate so that the respective planetary gears 13 rotate in an accurately synchronized manner, so that no great force is applied. For this reason, the noise (rattling noise) caused by meshing of the internal spur gear 11, the planetary spur gears 14, and the sun spur gear 24 can be markedly reduced from that in the conventional planetary gear device.

As in the above, since the present planetary gear device is characterized by greatness in loading resistance in the thrust direction, as an application field thereof, reduction gears and speed-up gears using common planetary gear devices as well as a field of usage as a rotating bearing device are preferable.

As a bearing capable of receiving positive and negative loads in the thrust direction, conventionally, an angular ball bearing using a plurality of rows of steel balls has been known. However, this type of angular ball bearing is used so as to eliminate backlash by preloading in the thrust direction between the inner ring and outer ring, so that a problem of a sudden increase in friction loss is caused by the preload and thrust load. In contrast thereto, when the planetary gear device constructed as in the above is used as a rotating bearing device, various advantages such that this can be used without preloading and can satisfactorily retain rotation under a thrust load can be expected.

In the aforementioned embodiment, the planetary spur gear 14 of the planetary gear 13 has been provided at only one-side end portion thereof, however, as shown in FIG. 12, planetary spur gears can also be provided on both sides of a planetary screw-like gear 215 of a planetary gear. In this case, although one is provided as a planetary spur gear 214a, the other is provided as a planetary spur gear screw 214b, and sun spur gears 224a and 224b of a sun gear and internal spur gears 211a and 211b of an internal gear 211 are separately formed and are press-fitted at the time of mounting, thus making it possible to assemble a planetary gear device. By providing the planetary spur gears 214a and 214b on both sides of the planetary screw-like gear 215 of a planetary gear in this manner, rotation of the planetary gear is more smoothly carried out.

As a matter of course, the retainers in a planetary gear mechanism are a very effective mechanism for mounting, on a circumference, planetary gears in an equiangular arrangement. However, the planetary gears in this case are restricted in position in the thrust direction and rotating direction. Therefore, in a planetary gear device not using retainers for input/output, it is also possible to use jigs in place of retainers when mounting the device, complete mounting of planetary gears by the jigs, and use no retainers for the device.

Third Embodiment

FIG. 13 shows a sectional view of a rotating translation device using a planetary gear device of the present invention as a bearing device. The rotating translation device has, as shown in FIG. 13, a structure where a translatory body 32 that linearly moves is disposed in a casing so as to be linearly movable, a threaded hole 33 is pierced through the translatory body 32, a screw shaft 34 is disposed while being screwed in the threaded hole 33, and the translatory body 32 is linearly moved by a rotational drive of the screw shaft 34. And, for supporting the screw shaft 34 so as to be rotatable in the casing 31, the present rotating bearing device is used.

This rotating bearing device is, as shown in FIG. 13, disposed at an end portion in the casing of the rotating translation device, and a tail-end portion of the screw shaft 34 is formed as a sun screw-like gear 34a, so that the male screw of the screw shaft 34 is used also as a sun screw-like gear 34a. And, the rotating bearing device is, similar to the aforementioned planetary gear device, composed of a sun gear 35 having a sun spur gear 36, an internal gear 41 having an internal spur gear 43, and planetary gears 38 having planetary spur gears 39 meshed between the sun gear 35 and the spur gear 43 of the internal gear 41.

And, similar to the above, the sun gear 35 coaxially has the sun screw-like gear 34a used also as the screw shaft 34 rotating integrally with the sun spur gear 36, and the internal gear 41 coaxially has a female screw-like gear 42 rotating integrally with the internal spur gear 43. Furthermore, the planetary gear 38 coaxially has a planetary screw-like gear 40 rotating integrally with the planetary spur gear 39, and the sun screw-like gear 34a and the planetary screw-like gear 40 are formed in screw shapes being in reverse directions to each other, equal in lead angle, and equal in screw pitch and are meshed with each other. And, the female screw-like gear 42 of the internal gear 41 and the planetary screw-like gear 40 are in a relationship of a female screw and a male screw being in an identical direction and formed in screw shapes equal in lead angles to each other and equal in screw pitches and are meshed with each other. And, the planetary spur gear 39 is formed so as to mesh with the sun spur gear 36 and also mesh with the internal spur gear 43 and so that a ratio of the effective screw diameters of the meshing sun screw-like gear 34a and planetary screw-like gear 40 coincides with a ratio of the screw thread numbers thereof, and a ratio of the effective screw diameters of the meshing female screw-like gear 42 and the planetary screw-like gear 40 coincides with a ratio of the screw thread numbers thereof.

The rotating translation device constructed as such is used in a manner that a serration portion 37 provided at a front end of the screw shaft 34 and the sun gear 36 is coupled with a rotational drive portion such as a motor and the screw shaft 34 is driven to rotate by a drive of the motor or the like. During a rotational drive of the screw shaft 34, the translatory body 32 screwed with the screw shaft 34 moves in the axial direction, and at this time, a reaction force thereto works on the screw shaft 34 as a thrust load.

However, since the screw shaft 34 is supported by the rotating bearing device composed of the planetary gear device of the present invention, the load in the thrust direction is received by meshing between the sun screw-like gear 34a and the planetary screw-like gear 40 and meshing between the planetary screw-like gear 40 and the female screw-like gear 42 of the internal gear 41 so that rotation is maintained. Therefore, according to the rotating bearing device using the planetary gear device, the rotating screw shaft 34 can be satisfactorily retained without increasing a bias in the thrust direction and friction loss of the shaft. In addition, according to the bearing device of the rotating translation device, since a part of the screw shaft 34 can also be used as the sun screw-like gear 34a, the device can be reduced in size. Here, the aforementioned screw shaft can also be provided as a ball screw, and a planetary roller screw can also be used.

Fourth Embodiment

FIG. 14 and FIG. 15 show a two-stage planetary gear device being a fourth embodiment of the present invention. For the two-stage planetary gear device, first-stage and second-stage planetary gear devices are formed while sharing an internal gear, and for example, input is carried out at a sun gear of the first-stage planetary gear mechanism, and output is carried out at retainers of planetary gears of the second-stage planetary gear mechanism, so that this can be applied to a speed reducer/increaser that can realize a large acceleration/deceleration ratio.

As shown in the sectional views of FIG. 14 and FIG. 15, for the two-stage planetary gear device, the first-stage planetary gear mechanism is disposed at the right side of the drawings, and the second-stage planetary gear mechanism is disposed at the left side of the drawings. Similar to the above, the first-stage planetary gear mechanism is basically composed of a sun gear 63, an internal gear 50, and planetary gears 53 meshed between the sun gear 63 and the internal gear 50.

On the sun gear 63 to be an input of the first stage, a sun screw-like gear 65 rotating integrally with a sun spur gear 64 is coaxially formed, on the internal gear 50, a female screw-like gear 52 rotating integrally with an internal spur gear 51 is coaxially formed, and furthermore, the planetary gear 53 is coaxially fitted with a planetary screw-like gear 55 rotating integrally with a planetary spur gear screw 54. The sun spur gear 64 and the internal spur gear 51 are manufactured separately from the body of the sun gear or the body of the internal gear 50 in consideration of assembly in manufacturing, and are formed so as to be fitted to the body of the sun gear or internal gear at the time of assembly of the gear mechanism.

Furthermore, for the two-stage planetary gear device, in consideration of assembly in manufacturing, a planetary spur gear of a planetary gear is formed, as in FIG. 16, as a planetary spur gear screw 54. The planetary spur gear screw 54 is formed, as shown in FIG. 16, so as to have both functions as a spur gear and a screw gear, while being divided like spur gears by slitting the screw-shaped part in the axial direction.

Also, the planetary spur gear screw 54 can also be provided as a planetary spur gear screw 59 formed in a shape divided like spur gears by slitting the entire screw-shaped part in the axial direction, so that, as shown in FIG. 17, a planetary gear 58 as a whole has both functions as a spur gear and a screw gear.

For the first-stage planetary gear mechanism, similar to the above, the sun screw-like gear 65 and the planetary screw-like gear 55 are formed in screw shapes being in reverse directions to each other, equal in lead angle, and equal in screw pitch and are meshed with each other. And, the female screw-like gear 52 of the internal gear 50 and the planetary screw-like gear 55 are in a relationship of a female screw and a male screw being in an identical direction, and are formed in screw shapes equal in lead angles to each other and equal in screw pitches and are meshed with each other. And, the planetary spur gear screw 54 is meshed with the sun spur gear 64 and also meshed with the internal spur gear 51 and a ratio of the effective screw diameters of the sun screw-like gear 65 and planetary screw-like gear 55 meshing with each other coincides with a ratio of the screw thread numbers thereof. Furthermore, a ratio of the effective screw diameters of the female screw-like gear 52 and the planetary screw-like gear 55 meshing with each other coincides with a ratio of the screw thread numbers thereof.

Furthermore, the planetary gears 53 are arranged on an outer circumference of the sun gear 63, however, similar to the above, the arranging number thereof is limited by the thread number of the female screw-like gear 52 and the thread number of the sun screw-like gear 65. A planetary shaft 56 of each planetary gear 53 is freely rotatably supported at an outer end portion thereof by a bearing hole provided in an annular retainer 57, and an inner end portion of the planetary shaft 56 of each planetary gear 53 is, so as to be supported by a sun gear 83 of the second-stage planetary gear device adjacently arranged in the same internal gear 50, fitted in a hole provided in the sun gear 83 and is coupled.

The second-stage is, similar to the above, basically composed of a sun gear 83, an internal gear 70, and planetary gears 73 meshed between the sun gear 83 and the internal gear 70. To the sun gear 83 to be an input of the second stage, as in the above, the planetary shaft 56 of each planetary gear 53 of the first stage is coupled so as to be inserted into the bearing hole. On the sun gear 83, a sun screw-like gear 85 is formed, and a sun spur gear 84 is coaxially attached by fitting so as to rotate integrally with this gear. The internal gear 70 of the second stage is formed integrally with the internal gear 50 of the first stage, and the female screw-like gear 52 inside thereof is integrally formed and shared by the first stage and the second stage. The internal gear 70 is attached by fitting with the internal spur gear 71 coaxially with the female screw-like gear 52.

Furthermore, on the planetary gear 73, a planetary screw-like gear 75 is formed, and a planetary spur gear 74 rotating integrally with the planetary screw-like gear 75 is coaxially fitted. The sun spur gear 84 and the internal spur gear 71 of the second stage are also manufactured separately from the body of the sun gear 83 or the body of the internal gear 70 in consideration of assembly in manufacturing, and attached by fitting to the body of the sun gear or internal gear at the time of assembly of the gear mechanism.

For the second-stage planetary gear mechanism, similar to the above, the sun screw-like gear 85 and the planetary screw-like gear 75 are formed in screw shapes being in reverse directions to each other, equal in lead angle, and equal in screw pitch and are meshed with each other. And, the female screw-like gear 52 of the internal gear 70 and the planetary screw-like gear 75 are in a relationship of a female screw and a male screw being in an identical direction, and formed in screw shapes equal in lead angles to each other and equal in screw pitches and are meshed with each other. In addition, the planetary spur gear screw 74 is meshed with the sun spur gear 84 and also meshed with the internal spur gear 71 and a ratio of the effective screw diameters of the sun screw-like gear 85 and planetary screw-like gear 75 meshing with each other coincides with a ratio of the screw thread numbers thereof. Furthermore, a ratio of the effective screw diameters of the female screw-like gear 72 and the planetary screw-like gear 75 meshing with each other coincides with a ratio of the screw thread numbers Furthermore, the planetary gears 73 are arranged on an outer circumference of the sun gear 83, however, similar to the above, the arranging number thereof is limited by the thread number of the sun screw-like gear 85 and the thread number of the female screw-like gear 52. An inner end portion of a planetary shaft 76 of each planetary gear 73 is freely rotatably supported by a bearing hole provided in an annular retainer 77. On the other hand, an outer end portion of the planetary shaft 76 is freely rotatably supported by a bearing hole provided in an annular retainer 78, and the retainer 78 is to be an output of the present planetary gear device.

For the two-stage planetary gear device constructed as in the above, in manufacturing thereof, a method for mounting the internal gears 50 and 70, the planetary gears 53 and 73, and the sun gears 63 and 83 comes into question, and in particular, it is necessary to incorporate the internal spur gears 51 and 71 of the internal gears 50 and 70 and the female screw-like gear 52 into the first-stage and the second-stage planetary gears 53 and 73. At this time, for at least one of the stages of planetary gears, the part of the planetary spur gear screws 54 or the planetary spur gears 74 must pass through the female screw-like gear 52 of the internal gear 50 or 70. Therefore, in the present planetary gear device, the spur gear part of each planetary gear 53 is formed as a planetary spur gear screw 54 being a structure that can serve both as a screw and a spur gear.

Here, with the structure serving both as a screw-like gear and a spur gear, gear strength declines, and this can be detrimental to torque transmission capability, so that the planetary spur gear screw 54 is used, in a case of a speed reducer, for the planetary gear 53 lower in the transmission torque at the input side.

To describe a method for assembling the present planetary device based on the aforementioned point, first, a first subassembly including the second-stage sun gear 83 and the first-stage planetary gears 53 is assembled. In the sun gear 83, holes for inserting the planetary shafts 56 have been pierced in a ring format predetermined intervals, the planetary shafts 56 are fitted into these holes, the planetary gear 53 is fitted on each planetary shaft 56 by insertion, and the first-stage retainer 57 is fitted at an end portion of each planetary shaft 56 so that the first-stage planetary gears 53 are freely rotatably supported by the retainer 57 and the second-stage sun gear 83, thus the first subassembly is assembled.

Next, a second subassembly including the second-stage planetary gears 73 and the retainers 77 and 78 is assembled. In the annular retainer 78, holes for the planetary shafts 76 have been pierced in a ring form at predetermined intervals, and end portions of the planetary shafts 76 are fitted into these holes. And, the planetary gear 73 is fitted on each planetary shaft 76 by insertion, and the retainer 77 is fitted at the other end thereof, whereby each planetary gear 73 is freely rotatably supported between the retainers 77 and 78, thus the second assembly is assembled.

Next, the first assembly and the second assembly are mounted. Here, first, the sun screw-like gear 85 of the sun gear 83 of the first subassembly is inserted and meshed with the planetary screw-like gears 75 of the planetary gears 73 of the second subassembly. At this time, the sun gear 83 of the first subassembly is rotated to produce a sliding friction between the sun screw-like gear 85 and the planetary screw-like gear 75, and the sun screw-like gear 85 is inserted inside the planetary screw-like gears 75 in a screwing manner. Then, when insertion of the sun gear 83 up to a predetermined position has been completed, rotation of the sun gear 83 is stopped, and the sun spur gear 84 is press-fitted into the sun gear 83 of the first subassembly while meshing the same with the planetary spur gears 74. Then, the sun gear 83 of the first subassembly and the planetary gears 73 of the second subassembly are fixed in the thrust direction, and the planetary gears 73 are freely rotatably fitted to the sun gear 83.

Next, the assembly integrating the first subassembly and the second subassembly is inserted, while being rotated, into the internal gears 50 and 70 so as to first insert the planetary gears 53. Since the first-stage planetary gear 53 is formed at its planetary spur gear part as the planetary spur gear screw 54 and is therefore a complex part of a screw shape and a spur gear shape, the part of the planetary spur gear screw 54 can be screwed into the internal spur gears 50 and 70. In addition, the female screw-like gear 52 of the internal gears 50 and 70 and the planetary spur gear screw 54 are in a relationship of a male screw and a female screw so that the assembly can be inserted while producing a sliding friction by rotation.

Next, in a condition where the first and second subassemblies have been inserted up to a fixed position in the internal gears 50 and 70, the internal spur gear 71 is press-fitted in the internal gear 70 for attachment, and similarly, press-fitted at a fixed position in the internal gear 50 are the internal spur gear 51 of the internal gear 50, so as to be meshed with the planetary spur gear screws 54 of the planetary gears 53, and the internal spur gear 71 of the internal gear 70, so as to be meshed with the planetary spur gear screws 74 of the planetary gears 73. By the press fitting of the internal spur gears 51 and 71, the first and second subassemblies and the internal gear 50 are mounted in a state where these are freely rotatable and are not displaced in the thrust direction.

Lastly, the first-stage sun gear 63 is inserted inside the planetary gears 53 while being rotated. At this time, the planetary gears 53, the sun gear 83 coupled thereto, and the planetary gears 73 are in a freely rotatable state. And, when the sun gear 63 is inserted up to a predetermined position, the sun spur gear 64 is press-fitted into the sun gear 63 while being meshed with the planetary spur gear screws 54 of the planetary gears 53. Thereby, assembly of the two-stage planetary gear device is completed.

In the two-stage planetary gear device, a rotational input is inputted into the first-stage sun gear 63, and when the sun gear 63 rotates, the rotation is transmitted to the planetary gears 53, and only an orbital rotation of the planetary gears 53 is transmitted to the second-stage sun gear 83 so that the speed is reduced. Rotation of the sun gear 83 is similarly transmitted to the second-stage planetary gears 73, and an orbital rotation of the planetary gears 73 is transmitted to a retainer 78, and this is outputted from the retainer 78 as a rotation reduced in speed in the two stages.

As such, according to the present planetary gear device, similar to the above, the planetary screw-like gears 55 and 75, the female screw-like gear 52, and the sun screw-like gears 65 and 85 of the planetary gears 53 and 73, the internal gears 50 and 70, and the planetary screw-like gears 55 and 75 of the sun gears 63 and 83 mesh with each other, and with only meshing of the screw-shaped gears, the planetary gear device rotates while preventing a shift in the thrust direction, therefore, backlash that easily occurs in a planetary gear device composed only of spur gears hardly occurs, and the device can satisfactorily rotate even under a load in the thrust direction. In addition, since the thrust load can be received between the screw-like gears and female screw-like gear, a special bearing such as an angular bearing is not required, so that the planetary gear device can be reduced in size, and the manufacturing cost can be reduced.

Furthermore, according to the present planetary gear device, similar to the above, since rotational torque is transmitted by meshing by continuous tooth contact of the screw-like gears, it is possible to transmit a high rotational torque, and thus rotation transmission efficiency can be improved. In addition, the transmission of rotation is carried out mainly by meshing of the planetary screw-like gears 55 and 75, the female screw-like gear 52, and the sun screw-like gears 65 and 85 with each other, and the spur gears mainly operate so as to synchronize rotation of the respective planetary gears, so that the noise (rattling noise) caused by meshing of the spur gears can be markedly reduced from that in the conventional planetary gear device.

Furthermore, according to the two-stage planetary gear device, as shown in FIG. 14 and FIG. 15, the planetary screw-like gears 55 of the first-stage planetary gear 53 and the planetary screw-like gears 75 of the second-stage planetary gears 73 can be provided with opposite inclinations to each other. Thereby, a larger resistance can be retained against a load in the thrust direction, and an error due to a dimensional fluctuation in manufacturing is absorbed, and backlash can also be reduced.

Fifth Embodiment

FIG. 18 and FIG. 19 show an example of a planetary gear device for which planetary gears are formed in roughly conical shapes and the planetary gears are arranged along a roughly conical outer circumferential surface. In this example, by forming planetary gears 93 in roughly conical shapes and arranging the spur gears 93 along a roughly conical outer circumferential surface, a structure that can resist a greater force in the thrust direction is provided. As shown in FIG. 18 and FIG. 19, rotation axes of the respective planetary gears 93 are disposed with an inclination by an angle β with respect to the rotation center axis of a sun gear 87 and an internal gear 90.

The conical-shaped planetary gear device is, similar to the above, basically composed of the sun gear 87 having a sun screw-like gear 89, the internal gear 90 having a female screw-like gear 92, and planetary gears 93 having planetary screw-like gears 95 meshed between the sun screw-like gear 89 and the female screw-like gear 92 of the sun gear 87 and internal gear 90.

And, for the sun gear 87, a sun spur gear 88 is coaxially formed integrally at one side of the sun screw-like gear 89, for the internal gear 90, an internal spur gear 91 is formed integrally and coaxially at one side of the female screw-like gear 92, and for the planetary gear 93, planetary spur gears 94a and 94b are coaxially formed integrally on both sides of the planetary screw-like gear 95. The sun spur gear 84 of the sun gear 87 is manufactured separately from the body of the sun gear in consideration of assembly in manufacturing and is formed so as to be attached by fitting to the body of the sun gear at the time of assembly of the gear mechanism. In addition, the internal spur gear 91 of the internal gear 90 is also manufactured separately from the body of the internal gear in consideration of assembly in manufacturing and is formed so as to be attached by fitting to the body of the internal gear at the time of assembly of the gear mechanism.

Similar to the above, the sun screw-like gear 89 and the planetary screw-like gear 95 are formed in screw shapes being in reverse directions to each other, equal in lead angle, and equal in screw pitch and are meshed with each other. In addition, the female screw-like gear 92 of the internal gear 90 and the planetary screw-like gear 95 have a relationship of a female screw and a male screw being in an identical direction, are formed in screw shapes equal in lead angle and equal in screw pitch to each other and are meshed with each other. In addition, the planetary spur gears 94a and 94b are meshed with the sun spur gear 88 and are also meshed with the internal spur gear 91, and a ratio of effective screw diameters of the sun screw-like gear 89 and the planetary screw-like gear 95 meshing with each other is coincident with a ratio of the screw thread numbers of these. Furthermore, a ratio of effective screw diameters of the female screw-like gear 92 and the planetary screw-like gear 95 meshing with each other is coincident with a ratio of the screw thread numbers of these.

The planetary gears 93 are disposed on an outer circumference of the sun gear 87, however, similar to the above, the arranging number thereof is limited by the thread number of the sun screw-like gear 89 and the female screw-like gear 92. A planetary shaft 96 of each planetary gear 93 is freely rotatably supported at both end portions thereof by bearing holes provided in annular retainers 97 and 98 and is revolvable with rotation around the sun gear 87.

Furthermore, as shown in FIG. 18, the center axis of each planetary gear 93 is arranged with an inclination by an angle β with respect to the rotation center axis (line L passing through a point O) of the sun gear 87 and the internal gear 90, and the surface (outer circumferential surface) along the effective screw diameter of the sun screw-like gear 89 of the sun gear 87 is inclined by an angle θ with respect to the rotation center axis L.

At this time, where an intersection of a perpendicular H dropped onto the center line L is a point P and a contact of the perpendicular H with the outer circumferential surface of the sun screw-like gear 89 of the sun gear 87 is A, the effective screw diameter (line AP) is equal to the effective screw diameter of a conical shape, and where a distance from the point O to the point P is x and a distance from the point A to the point P is y, $y = x \cdot \tan \theta$.

The conical-shaped planetary gear 93 that contacts the sun screw-like gear 89 of the sun gear 87 is considered. Where an intersection of the effective screw diameter of the planetary screw-like gear 95 of the planetary gear 93 to the effective screw diameter of the sun screw-like gear 89 of the sun gear 87 is a point A, an intersection of the effective screw diameter of the planetary gear 93 to the effective screw diameter of the female screw-like gear 92 is a point B, and a distance between the point A and the point B is z, a ratio of z to the aforementioned y is coincident with a ratio of the screw thread number of the planetary screw-like gear 95 of the planetary gear 95. In addition, a ratio of (z+y) to Z is coincident with a ratio of the screw thread number of the female screw-like gear 92 of the internal gear 90 to the screw thread number of the planetary screw-like gear 95 of the planetary gear 93.

Furthermore, as shown in FIG. 18, where an angle created by the points A, O, and B is α, the angle α is equal to an angle created by the effective screw diameter of the conical-shaped planetary gear 93. Therefore, the planetary gear device can be used as a speed-up gear or a reduction gear and can be used as a bearing device that can resist an extremely large thrust load such as a tapered roller bearing.

In addition, the planetary gear 93 is, as shown in FIG. 18, disposed against the internal spur gear 91 of the inner gear 90 and the sun spur gear 88 of the sun gear 87 so as to prevent a displacement in the thrust direction, and at the time of mounting, for making it possible to insert the same, the internal spur gear 91 of the inner gear 90 is provided at a part close in distance from the point O, and the sun spur gear 88 of the sun gear 87 is arranged at a part distant from the point O. The retainers 97 and 98 retaining the planetary gears 93 are opened at one end of a hole in a contact part with the planetary gear 93 so as to make it possible to easily insert the inclined planetary gears 93.

FIG. 19 shows an enlarged view of a meshing condition between the planetary gear 93 and the sun gear 87 and internal gear 90. As shown in FIG. 19, the sun gear 87 and internal gear 90 are formed with screw thread forms that allow die forming so that manufacturing at a low cost and mass production thereof are possible. More specifically, for allowing manufacturing by pressing, die forming, or the like, the screw thread form must always have a positive angle with respect to a die forming direction, and as shown in FIG. 19, the form of the sun screw-like gear 89 of the sun gear 87 is formed so as to have a positive angle, with respect to the center axis, from the point O direction, and similarly, the internal gear 90 is formed with a positive angle, so as to allow die releasing, from a reverse direction of the point O.

As such, the sun screw-like gear 89 of the sun gear 87 and the female screw-like gear 92 of the internal gear 90 allow die forming since the screw threads thereof have positive angles with respect to the die-releasing directions, thus these can be easily manufactured at a low cost by die forming. In addition, although a planetary gear device using spur gears generally requires a high accuracy in manufacturing of the gears, the spur gears are inferior in the meshing ratio and tooth chipping easily occurs. However, since the inner spur gear 91, the planetary spur gears 94a and 94b, and the sun spur gear 88 used in the present planetary gear device merely carry out a supplementary rotation transmission because of the presence of the female screw-like gear 92, the planetary screw-like gears 95, and the sun screw-like gear 98, high accuracy and strength are not really required, and these can be easily fabricated by molding such as synthetic resin or metal injection suitable for mass production. Moreover, the screw threads are formed in smooth forms as in the above, which is suitable for mass production, so that the gears can be manufactured at a low cost.

Sixth Embodiment

FIG. 20 shows an example of a planetary gear device of the present invention applied to a magical planetary gear speed reducer, and the magical planetary gear speed reducer is a speed reducing mechanism that can realize a large deceleration ratio. The magical planetary gear speed reducer is, as shown in FIG. 20, a gear mechanism that uses an input axis 114 coupled to a sun gear 110 as an input and is decelerated by meshing of gears of planetary gears 103, a fixed internal gear 116, and a driven internal gear 100 being an output.

A deceleration ratio U of the magical planetary gear speed reducer is

Deceleration ratio $U=(1+zD/zA)/(1-zD/zC)$ where

Tooth number of the sun gear 110: $zA$

Tooth number of the fixed internal gear 116: $zD$

Tooth number of the fixed internal gear 100: $zC$

In FIG. 20, reference numeral 117 denotes a fixed portion, which is fixed to a rotary drive portion 115 such as a motor, and a rotation axis of the motor or the like is coupled to the sun gear 110 as the input axis 114. The sun gear 110 is formed in a cylindrical shape, and on both sides of a sun screw-like gear 112 formed at an outer circumferential portion thereof, sun spur gears 111 and 113 are formed.

Reference numeral 103 denotes a planetary gear, in a center portion of which a planetary screw-like gear 105 is formed, and planetary spur gears 104 and 106 are formed on both sides thereof. To a shaft portion at both ends of the planetary gear 103, annular retainers 107 and 108 are fitted, and by the retainers 107 and 108 provided on both sides, three planetary gears 103 are freely rotatably retained, outside the sun gear 110 and inside the driven internal gear 100, while being equally distributed on a circumference. Internal gears are included as the stationary fixed internal gear 116 and the rotating driven internal gear 100, and the fixed internal gear 116 is fixed inside the fixing portion 117, while the driven internal gear 100 is rotatably fitted to the fixed portion 117 in a covering manner from the outside of the planetary gear 103. The planetary spur gear 106 of the planetary gear 103 meshes with the fixed internal gear 116, and the planetary spur gear 104 at the other side of the planetary gear 103 meshes with a driven internal spur gear 101.

The driven internal gear 100 is formed, at the inside thereof, with a driven screw-like gear 102 and the driven internal spur gear 101, and the driven screw-like gear 102 meshes with the planetary screw-like gear 105 formed at an outer circumferential portion of the planetary gear 103. Furthermore, a front-end portion of the driven internal gear 100 is attached with an output axis 109.

As in the above, the present magical planetary gear speed reducer is a device that has two internal gears of the fixed internal gear 116 and the rotating driven internal gear 100 and produces rotation generated, when one is fixed, at the other by taking advantage of the difference in the tooth number between these internal gears. Therefore, the tooth number of the driven internal spur gear 101 is set here to 48, and the tooth number of the fixed internal gear 116, to 45. And, the effective screw diameter (spur gear pitch circle), the gear tooth number, and the screw thread number of each screw-like gear are set as follows.

That is, for the effective screw diameter of the planetary screw-like gear 105, the screw diameter of the planetary screw-like gear 105 to the screw diameter of the sun gear 110 to the screw diameter of the driven female screw-like gear 102 is provided at 1:2:4, and with regard to the screw thread number, the planetary screw-like gear 105 is provided as a double-threaded left-hand screw, and the sun screw-like gear 112, as a 4-threaded right-hand screw, and a screw portion of the driven female screw-like gear 102, as an 8-threaded left-hand female screw. And, similar to the above, the sun screw-like gear 112 and the planetary screw-like gear 105 are formed in screw shapes being in reverse directions to each other, equal in lead angle, and equal in screw pitch and are meshed with each other. In addition, the driven female screw-like gear 102 and the planetary screw-like gear 105 are formed in screw shapes equal in lead angle and equal in screw pitch to each other and are meshed with each other.

Furthermore, the maximum arranging number of the planetary gears 103 is usually equal to a sum of the thread number of the sun screw-like gear 112 and the thread number of the screw portion of the driven female screw-like gear 102 and is therefore 12, however, 12 planetary gears cannot be arranged since a ratio of the diameter of the sun screw-like gear 112 relative to the diameter of the planetary screw-like gear 105 is 2, which is small, so that the maximum number of the planetary gears 103 is 6. Nevertheless, for reasons described later, the arranging number of the planetary gears 103 is set to 3 in the present example.

Furthermore, the tooth number of the planetary spur gears 104 and 106 can take a multiple of 3 being the arranging number of the planetary gears 103. Accordingly, the spur gear tooth number of the planetary spur gears 104 and 106 is set to 12. Consequently, based on the diameter ratio, the tooth number of the sun spur gear portions 111 and 113 of the sun gear 110 is 24, and the driven internal spur gear 101 has, based on the diameter ratio, a tooth number of 48.

Furthermore, for constructing a magical planetary gear speed reducer, it is necessary to provide the fixed internal gear 116 with a difference in tooth number from the tooth number of the driven internal spur gear 101. Generally, for a smooth rotation, the difference in tooth number is set small. In addition, a smaller difference in tooth number allows increasing the deceleration ratio, which is an advantage of the magical planetary gear speed reducer.

However, the difference between the tooth number of the fixed internal gear 116 and the tooth number of the driven internal spur gear 101 is, as a matter of course, restricted by the number of the planetary gears 103 equally distributed on the circumference. More specifically, the planetary gear 103 is determined in terms of the phase of the planetary spur gear 104 at a position on the circumference. Therefore, in the magical planetary gear speed reducer, concerning the arranging position of the planetary gears 103, employed is an arrangement where a phase relationship of the planetary gear 103, the sun gear 110, and the driven internal gear 100 is equal in each planetary gear 103. Therefore, the difference in tooth number is 1 at minimum between the adjacent planetary gears 103. That is, the arranging number of the planetary gears 103 must coincide with the minimum difference in tooth number between the fixed internal gear 116 and the driven internal spur gear 101. Consequently, the arranging number of the planetary gears 103 is set to 3, and the tooth number of the fixed internal gear 116 is set to 45 based on a formula 48−3=45.

In addition, the fixed internal gear 116 must carry out meshing of gears different in tooth number in terms of the meshing pitch circle diameter with a difference in tooth number. More specifically, for reduction in tooth number of the pitch circle diameter, the fixed internal gear 116 forms an internal gear with a negative addendum modification so as to have a meshing diameter equal to the effective screw diameter.

Next, an assembling method for assembling a magical planetary gear speed reducer constructed as in the above will be described. To assemble a magical planetary gear speed reducer, first, the three planetary gears 103 are mounted on the retainers 107 and 108 so as to form a first subassembly, and the sun gear 110 is inserted into the first subassembly.

For making it possible to insert the sun gear 110 into the first subassembly, it is necessary that the planetary spur gears 104 and 106 at both ends of the planetary gear 103 are each provided as a planetary spur gear screw serving both as a screw-like gear and a spur gear, so that the planetary spur gears 104 and 106 are each provided as a planetary spur gear screw serving both as a screw-like gear and a spur gear. And, the sun gear 110 without the sun spur gears 111 and 113 is screwed into the first subassembly up to a predetermined position, and then the sun spur gears 111 and 113 of the sun gear 110 are press-fitted in the sun gear 110.

Next, such a mounted structure of the sun gear 110 and the planetary gears 103 is provided as a second subassembly, and the second subassembly is screwed into the driven internal gear 100. Then, when the second subassembly has been screwed up to a predetermined position, the driven internal spur gear 101 is press-fitted and fixed to the driven internal gear 100 while maintaining meshing between the driven internal gear 101 of the driven internal gear 100 and the planetary spur gear 104 of the planetary gear 103. And, the output axis 109 is fixed to the front-end portion of the driven internal gear 100 so as to be protruded therefrom, and the output axis 109 serves as an output end of the speed reducer.

Next, to describe operations of a magical planetary gear speed reducing mechanism constructed as in the above, a rotary input thereof is inputted to the sun gear 110 by the rotary drive portion 115 such as a motor. When the sun gear 110 is driven to rotate by the rotary drive portion 115, as a result of rotation transmitted mainly by meshing between the sun screw-like gear 112 and the planetary screw-like gear 105, the planetary gear 103 carries out a rotary motion involving rotation and revolution around the sun gear 110. At this time, since the non-rotating fixed portion 117 and the fixed internal gear 116 with a difference in tooth number from the driven internal gear 101 have been integrated, the retainers 107 and 108 retaining the planetary gears 103 increase in the number of rotations in comparison with the fixed internal gear 116 without a difference in tooth number. More specifically, revolution of the retainers 107 and 108 is formed to carry out more rotation for the difference in tooth number of the fixed internal gear 116 having a difference in tooth number from the driven internal gear 101, thus the speed is increased.

Therefore, the driven internal gear 100 relatively urges the planetary gears 103 and the sun gear 110 to carry out rotation commensurate with the difference in tooth number since the pitch circle diameter is based on the diameter ratio. Specifically, if the tooth numbers of the fixed internal gear 116 and the driven internal spur gear 101 are tooth numbers equal to the effective screw diameters, the driven internal gear 100 does not have a rotational displacement with respect to the fixed portion 117 as a result of rotation of the rotary drive portion 115, however, since the tooth numbers of the fixed internal gear 116 and the driven internal spur gear 101 have a difference, the driven internal gear 100 rotates with respect to the fixed portion 117 for the difference in tooth number. The rotational displacement is outputted to the driven internal gear 100 and is outputted to the output axis 109.

As such, for the present magical planetary gear speed reducer, the deceleration ratio is set to:

Deceleration ratio $U=(1+45/24)/(1-45/48)=46$, and a rotation having a deceleration ratio of 1/46 to rotation of the sun gear 110 is outputted by the driven internal gear 100 and the output axis 109.

As in the above, according to the present magical planetary gear speed reducer, although rotation with a high declaration ratio is outputted, a continuous rotation transmission is carried out by the driven female screw-like gear 102, the planetary screw-like gear 105, and the sun screw-like gear 112, so that a smooth rotation having less backlash can be carried out. Furthermore, since not very high rotary driving force is applied to rotation of the spur gears that easily produce a rattling noise, the rattling noise can be reduced. More specifically, the present magical planetary gear speed reducer has a structure that carries out a high speed reduction at a time and includes not many rotating portions, and rotation transmission thereof is carried out by the screw portions of the driven female screw-like gear 102, the planetary screw-like gear 105, and the sun screw-like gear 112, the meshing ratio is high, rotation is smooth, and the rattling noise can also be suppressed small. Furthermore, since this has a large resistance against a thrust load by meshing of the screw-like gears, it is not necessary to use a special thrust bearing or the like for the rotary shaft bearing, thus reduction in size of the device is possible, and it can be manufactured at a low cost with a reduced number of components.

Seventh Embodiment

FIG. 21 shows an example of another magical planetary gear speed reducer, and the magical planetary gear speed reducer is a speed reducing mechanism that can realize a larger deceleration ratio than that in the above. The magical planetary gear speed reducer is, as shown in FIG. 21, a gear mechanism that uses an input axis 214 coupled to a sun gear 210 as an input and is decelerated by meshing of gears of planetary gears 203, a fixed internal gear 216, and a driven internal gear 200 being an output.

The magnetic planetary gear speed reducer is characterized in that, by setting the tooth number of the fixed internal gear 216 to 47 and setting the tooth number of the driven internal spur gear 201 to 48, a deceleration ratio thereof is provided, based on the following formula, as:

Deceleration ratio $U=(1+47/24)/(1-47/48)=142$ so that a very large deceleration ratio of 1/142 can be realized, and furthermore, the arranging number of the planetary gears 203 is increased to six so as to make it possible to transmit a higher rotation torque.

In FIG. 21, reference numeral 217 denotes a fixed portion, which is fixed to a rotary drive portion 215 such as a motor, and a rotation axis of the motor or the like is coupled to the sun gear 210 as the input axis 214. The sun gear 210 is formed in a cylindrical shape, and on a driven side of a sun screw-like gear 212 formed at an outer circumferential portion thereof, a sun spur gear 213 is formed.

Reference numeral 203 denotes a planetary gear, in a center portion of which a planetary screw-like gear 205 is formed, and planetary spur gears 204 and 206 are formed on both sides thereof. To a shaft portion at both ends of the planetary gear 203, annular retainers 207 and 208 are fitted, and by the retainers 207 and 208 provided on both sides, six planetary gears 203 are freely rotatably retained, outside the sun gear 210 and inside the driven internal gear 200, while being equally distributed on a circumference. Internal gears are included as the stationary fixed internal gear 216 and the rotating driven internal gear 200, and the fixed internal gear 216 is fixed inside the fixing portion 217, while the driven internal gear 200 is rotatably fitted to the fixed portion 217 in a covering manner from the outside of the planetary gear 203. The planetary spur gear 206 of the planetary gear 203 meshes with the fixed internal gear 216, and the planetary spur gear 204 at the other side of the planetary gear 203 meshes with the driven internal spur gear 201.

The driven internal gear 200 is formed, at the inside thereof, with a driven screw-like gear 202 and the driven internal spur gear 201, and the driven screw-like gear 202 meshes with the planetary screw-like gear 205 formed at an outer circumferential portion of the planetary gear 203. Furthermore, a front-end portion of the driven internal gear 200 is attached with an output axis 209.

As in the above, the arranging number of the planetary gears 203 in the present magical planetary gear speed reducer is provided as 6, which is the maximum number for arrangement, the tooth number of the driven internal spur gear 201 is set to 48, and the tooth number of the fixed internal gear 216, to 47, and the effective screw diameter (spur gear pitch circle), the gear tooth number, and the screw thread number of each screw-like gear are set as follows.

That is, the effective screw diameter of the planetary screw-like gear 205 to the effective screw diameter of the sun gear 210 to the effective screw diameter of the driven female screw-like gear 202 is set to 1:2:4. With regard to the screw thread number, the planetary screw-like gear 205 is provided as a double-threaded left-hand screw, and the sun screw-like gear 212, as a 4-threaded right-hand screw, and a screw portion of the driven female screw-like gear 202, as an 8-threaded left-hand female screw. And, similar to the above, the sun screw-like gear 212 and the planetary screw-like gear 205 are formed in screw shapes being in reverse directions to each other, equal in lead angle, and equal in screw pitch and are meshed with each other. In addition, the driven female screw-like gear 202 and the planetary screw-like gear 205 are formed in screw shapes equal in lead angle and equal in screw pitch to each other and are meshed with each other.

Furthermore, the tooth number of the planetary spur gears 204 and 206 can take a multiple of 6 being the arranging number of the planetary gears 203. Accordingly, the spur gear tooth number of the planetary spur gears 204 and 206 is set to 12. Consequently, based on the diameter ratio, the tooth number of the sun spur gears 213 of the sun gear 210 is 24, and the driven internal spur gear 201 has, based on the diameter ratio, a tooth number of 48. And, in order to minimize the difference in tooth number of the internal spur gear to 1, the tooth number of the fixed internal gear 216 is set to 47 as in the above.

Furthermore, the arranging number of the planetary gear 203 has been provided as 6, which is the maximum number, and in order to realize the six planetary gears 203, the respective planetary spur gears 204 to be meshed with the driven internal spur gear 201 may all be identical in phase, however, it is necessary to shift the six respective planetary spur gears 206 to be meshed with the fixed internal gear 216 in phase by predetermined angles, in order. More specifically, as in the above, where the tooth number of the fixed internal gear 216 is 47, the tooth number of the driven internal spur gear 201 is 48, and the tooth number of the planetary spur gears 204 and 206 is 12, a phase difference of the planetary spur gear 206 at one side of the equally distributed planetary gear 203 from the planetary spur gear 204 at the other side is provided, based on the following formula, as:

Phase difference=360°×{tooth number (48) of driven internal spur gear—tooth number (47) of fixed internal gear}÷tooth number (12) of planetary gear÷number (6) of planetary gears=360÷12÷6=5° so that the planetary spur gear 206 of each planetary gear 203 is shifted in phase by 5° from the planetary spur gear 204, thus the planetary spur gears 206 of the six respective planetary gears 203 arranged around the sun gear 210 are set in a manner shifted in phase in the circumferential direction from the planetary spur gears 204 by 0°, 5°, 10°, 15°, 20°, and 25°, in order.

In other words, since the tooth number of the planetary spur gears 204 and 206 is 12, an angle per each tooth is 360°/12=30°, and by 5° obtained by equally dividing the angle 30° into six equal parts, each planetary spur gear 206 is shifted in phase from the planetary spur gear 204. As such, since the planetary spur gear 206 of each planetary gear 203 is shifted in phase from the planetary spur gear 204 by 5°, different from the aforementioned case of FIG. 20, the sun spur gear 213 of the sun gear 210 is provided at only one side, and sun spur gears cannot be provided at both ends.

Next, an assembling method for assembling a magical planetary gear speed reducer constructed as in the above will be described. To assemble a magical planetary gear speed reducer, similar to the above, first, the six planetary gears 203 are mounted on the retainers 207 and 208 so as to form a first subassembly, and the sun gear 210 is inserted into the first subassembly.

For making it possible to insert the sun gear 210 into the first subassembly, it is necessary that the planetary spur gears 204 and 206 at both ends of the planetary gear 103 are each provided as a planetary spur gear screw serving both as a screw-like gear and a spur gear, so that the planetary spur gears 204 and 206 are each provided as a planetary spur gear screw serving both as a screw-like gear and a spur gear. And, the sun gear 210 without the sun spur gear 213 is screwed into the first subassembly up to a predetermined position, and then the sun spur gear 213 of the sun gear 210 is press-fitted in the sun gear 210.

Next, such a mounted structure of the sun gear 210 and the planetary gears 203 is provided as a second subassembly, and the second subassembly is screwed into the driven internal gear 200. Then, when the second subassembly has been screwed up to a predetermined position, the driven internal spur gear 201 is press-fitted and fixed to the driven internal gear 200 while maintaining meshing between the driven internal gear 201 of the driven internal gear 200 and the planetary spur gear 204 of the planetary gear 203. And, the output axis 209 is fixed to the front-end portion of the driven internal gear 200 so as to be protruded therefrom, and the output axis 209 serves as an output end of the speed reducer.

Now, to describe operations of a magical planetary gear speed reducing mechanism constructed as in the above, a rotary input thereof is inputted to the sun gear 210 by the rotary drive portion 215 such as a motor. When the sun gear 210 is driven to rotate by the rotary drive portion 215, as a result of rotation transmitted mainly by meshing between the sun screw-like gear 212 and the planetary screw-like gear 205, the planetary gear 203 carries out a rotary motion involving rotation and revolution around the sun gear 210. At this time, since the non-rotating fixed portion 217 and the fixed internal gear 216 with a difference in tooth number from the driven internal gear 201 have been integrated, the retainers 207 and 208 retaining the planetary gears 203 increase in the number of rotations in comparison with the fixed internal gear 216 without a difference in tooth number. More specifically, revolution of the retainers 207 and 208 is formed to carry out more rotation for the difference in tooth number of the fixed internal gear 216 having a difference in tooth number from the driven internal gear 201, thus the speed is increased.

Therefore, the driven internal gear 200 relatively urges the planetary gears 203 and the sun gear 210 to carry out rotation commensurate with the difference in tooth number since the pitch circle diameter is based on the diameter ratio. Specifically, if the tooth numbers of the fixed internal gear 216 and the driven internal spur gear 201 are tooth numbers equal to the effective screw diameters, the driven internal gear 200 does not have a rotational displacement with respect to the fixed portion 217 as a result of rotation of the rotary drive portion 215, however, since the tooth numbers of the fixed internal gear 216 and the driven internal spur gear 201 have a difference, the driven internal gear 200 rotates with respect to the fixed portion 217 for the difference in tooth number. The rotational displacement is outputted to the driven internal gear 200 and is outputted to the output axis 209.

As such, for the present magical planetary gear speed reducer, since the deceleration ratio is set, as in the above, to:

Deceleration ratio $U=(1+47/24)/(1-47/48)=142$, a rotation having a deceleration ratio of 1/142 to rotation of the sun gear 210 is outputted by the driven internal gear 200 and the output axis 209.

As in the above, according to the present magical planetary gear speed reducer, a speed reducing mechanism having an extremely high deceleration ratio of 1/142 can be realized. In addition, since the arranging number of planetary gears can be increased to six, a higher rotational torque can be transmitted. Furthermore, similar to the above, by meshing of the screw-like gears, in addition to that a continuous rotation transmission is carried out so that a smooth rotation having less backlash is carried out, a speed reducer having a large resistance against a thrust load can be provided. Furthermore, not very high rotary driving force is applied to rotation of the spur gears that easily produce a rattling noise, so that the rattling noise can be reduced. Although in the above, a difference in tooth number has been provided between the fixed internal gear 216 and the driven internal spur gear 201, a difference in tooth number can be provided between the sun spur gear 211 and the sun spur gear 213.

As in the above, by making a smooth rotation possible and using screw-like gears high in torque transmission capability for a main rotation transmission, occurrence of locking at spur gear meshing portions, which has been a problem in the conventional planetary gear mechanism, can be prevented. More specifically, by the present invention, the magical planetary gear mechanism can be provided as a more practical structure, thus assuring a perfect operation. In addition, by forming a magical planetary gear mechanism having high efficiency with less friction loss of the gears and having less backlash in the rotating direction and the thrust direction into a simple and rational structure, this can be realized by a low-cost processing method for which no excessive gear form accuracy is required.

What is claimed is:

1. A planetary gear device comprising a sun gear having a sun spur gear, an internal gear having an internal spur gear, and a planetary gear having a planetary spur gear meshed between the spur gears of the sun gear and internal gear, wherein the sun gear coaxially has a sun screw-shaped gear rotating integrally with the sun spur gear, the internal gear coaxially has a female screw-shaped gear rotating integrally with the internal spur gear, the planetary gear coaxially has a planetary screw-shaped gear rotating integrally with the planetary spur gear, the sun screw-shaped gear and the planetary screw-shaped gear are formed in screw shapes being in reverse directions to each other, equal in lead angle, and equal in screw pitch and are meshed with each other, the female screw-shaped gear of the internal gear and the planetary screw-shaped gear are formed in screw shapes equal in lead angle and equal in screw pitch to each other and are meshed with each other, the planetary spur gear is meshed with the sun spur gear and is also meshed with the internal spur gear, a ratio of effective screw diameters of the meshing sun screw-shaped gear and planetary screw-shaped gear is coincident with a ratio of screw thread numbers, and a ratio of effective screw diameters of the meshing female-screw-shaped gear and planetary screw-shaped gear is coincident with a ratio of screw thread numbers, and wherein the planetary gears are supported about axes at equiangular intervals around the sun gear, and the number of the planetary gears is equal to a sum of a thread number of the sun screw-shaped gear of the sun gear and a thread number of the female screw-shaped gear of the internal gear or a divisor of the sum of these threads numbers.

2. The planetary gear device according to claim 1, wherein the planetary spur gear of the planetary gear is formed in a shape capable of screw meshing with the female screw-shaped gear of the internal gear and the sun screw-shaped gear of the sun gear.

3. The planetary gear device according to claim 1, wherein respective tooth numbers of the planetary spur gear, sun spur gear, and internal spur gear are equal to a sum of the thread number of the sun screw-shaped gear of the sun gear and the thread number of the female screw-shaped gear of the internal gear or a multiple of these threads numbers.

4. The planetary gear device according to claim 1, wherein a plurality of planetary gear devices are disposed in an identical internal gear while sharing a female screw-shaped gear of the internal gear, a plurality of planetary gears of one planetary gear device are interconnected while supported about axes on an annular portion of a sun gear of the other planetary gear device, and a shape of a planetary spur gear portion of the planetary gear has a shape capable of meshing with the female screw-shaped gear and sun screw-shaped gear and carries out acceleration and deceleration at a plurality of steps.

5. The planetary gear device according to claim 1, wherein the planetary screw-shaped gear of the planetary gear is supported about an axis with an inclination against a point of a rotation axis vertical to a rotational plane, and a shape of the planetary screw-shaped gear is formed in a conical shape.

6. The planetary gear device according to claim 1, wherein the internal spur gear, the planetary spur gear, and sun spur gear are formed of helical gears having helical teeth whose inclination angle with respect to an axial direction is less than 30 degrees.

7. The planetary gear device according to claim 5, wherein the sun screw-shaped gear has a tooth form shape in a form where extended straight lines of tooth forms of the sun screw-shaped gear of the sun gear and the female screw-shaped gear of the internal gear intersect to a rotation axis of the gears in a cone apex direction.

8. A rotating bearing device using a planetary gear device comprising a sun gear having a sun spur gear, an internal gear having an internal spur gear, and a planetary gear having a planetary spur gear meshed between the spur gears of the sun gear and internal gear, wherein the sun gear coaxially has a sun screw-shaped gear rotating integrally with the sun spur gear, the internal gear coaxially has a female screw-shaped gear rotating integrally with the internal spur gear, the planetary gear coaxially has a planetary screw-shaped gear rotating integrally with the planetary spur gear, the sun screw-shaped gear and the planetary screw-shaped gear are formed in screw shapes being in reverse directions to each other, equal in lead angle, and equal in screw pitch and are meshed with each other, the female screw-shaped gear of the internal gear and the planetary screw-shaped gear are formed in screw shapes equal in lead angle and equal in screw pitch to each other and are meshed with each other, the planetary spur gear is meshed with the sun spur gear and is also meshed with the internal spur gear, a ratio of effective screw diameters of the meshing sun screw-shaped gear and planetary screw-shaped gear is coincident with a ratio of screw thread numbers, and a ratio of effective screw diameters of the meshing female-screw-shaped gear and planetary screw-shaped gear is coincident with a ratio of screw thread numbers, and wherein the planetary gears are supported about axes at equiangular intervals around the sun gear, and a number of the planetary gears is equal to a sum of a thread number of the sun screw-shaped gear of the sun gear and a thread number of the female screw-shaped gear of the internal gear or a divisor of the sum of these threads numbers.

9. A two-stage planetary gear device for which a first-stage planetary gear mechanism comprising a sun gear having a sun spur gear and a planetary gear having a planetary spur gear meshed between the spur gears of the sun gear and an internal gear and a second-stage planetary gear mechanism comprising a sun gear having a sun spur gear and a planetary gear having a planetary spur gear meshed between the spur gears of the sun gear and the internal gear are disposed inside the common internal gear, and a planetary shaft of the first-stage planetary gear is coupled to the second-stage sun gear, wherein the first-stage and second-stage sun gears coaxially have sun screw-shaped gears rotating integrally with the sun spur gears, the common internal gear coaxially has a female screw-shaped gear rotating integrally with the internal spur gear, the first-stage and second-stage planetary gears coaxially have planetary screw-shaped gears rotating integrally with the planetary spur gears, the sun screw-shaped gear and the planetary screw-shaped gear are formed in screw shapes being in reverse directions to each other, equal in lead angle, and equal in screw pitch and are meshed with each other, the female screw-shaped gear of the internal gear and the planetary screw-shaped gear are formed in screw shapes equal in lead angle and equal in screw pitch to each other and are meshed with each other, the planetary spur gear is meshed with the sun spur gear and is meshed with the internal spur gear, a ratio of effective screw diameters of the meshing sun screw-shaped gear and planetary screw-shaped gear is coincident with a ratio of screw thread numbers, and a ratio of effective screw diameters of the meshing female-screw-shaped gear and planetary screw-shaped gear is coincident with a ratio of screw thread numbers, and wherein the planetary gears are supported about axes at equiangular intervals around the sun gear, and a number of the planetary gears is equal to a sum of a thread number of the sun screw-shaped gear of the sun gear and a thread number of the female screw-shaped gear of the internal gear or a divisor of the sum of these threads numbers.

10. A magical planetary gear mechanism having planetary gears comprising a pair of planetary spur gears at both coaxial ends of a screw-shaped gear, sun gears comprising a pair of sun spur gears meshed with the pair of planetary spur gears and a sun screw-shaped gear coaxially arranged with the sun spur gears, and internal spur gears comprising a pair of internal spur gears meshed with the pair of planetary spur gears, and female screw-shaped gears coaxially arranged with the internal spur gears, wherein the pair of sun spur gears is separated from the sun gears, or the pair of internal spur gears is separated from the internal spur gears, wherein a separated pair of sun spur gears or a separated pair of internal spur gears have a difference in a tooth number ratio relative to the pair of planetary spur gears, wherein the screw-shaped gears of the sun gears and the screw-shaped gears of the planetary gears are formed in screw shapes being in reverse directions to each other, equal in lead angle, and equal in screw pitch and are meshed with each other, the female screw-shaped gears of the internal gears and the screw-shaped gears of the planetary gears are formed in screw shapes equal in lead angle and equal in screw pitch to each other and are meshed with each other, a ratio of effective screw diameters of the meshing sun screw-shaped gears and planetary screw-shaped gears is coincident with a ratio of screw thread numbers, and a ratio of effective screw diameters of the meshing female-screw-shaped gears and planetary screw-shaped gears is coincident with a ratio of screw thread numbers, and wherein the planetary gears are supported about axes at equiangular intervals around the sun gears, a number of the planetary gears is equal to a sum of a thread number of the sun screw-shaped gears of the sun gears and a thread number of the female screw-shaped gears of the internal gears or a divisor of the sum of these threads numbers.

11. A magical planetary gear speed reducer comprising a fixed internal gear to be fixed, a plurality of planetary gears to be disposed at an inner circumferential side of the fixed internal gear, a sun gear to be disposed at an inner circumferential side of the plurality of planetary gears, and a driven internal gear to be disposed at an outer circumferential side of the plurality of planetary gears, wherein the planetary gear is provided with a first planetary spur gear and a second planetary spur gear, the fixed internal gear meshes with the second planetary spur gear, the first planetary spur gear meshes with a driven internal spur gear provided inside the driven internal gear, the sun gear is provided with a first sun spur gear and a second sun spur gear, the second sun spur gear meshes with the second planetary spur gear of the planetary gear, the first sun spur gear meshes with the first planetary spur gear of the planetary gear, and differences in a ratio of tooth number are provided between the fixed internal gear and the second planetary spur gear, and between the driven internal spur gear and the first planetary spur gear, wherein the sun gear coaxially has a sun screw-shaped gear rotating integrally with the first sun spur gear and the second sun spur gear, the driven internal gear coaxially has a driven female screw-shaped gear rotating integrally with the driven internal spur gear, the planetary gear coaxially has a planetary screw-shaped gear rotating integrally with the first planetary spur gear and the second planetary spur gear, the sun screw-shaped gear and the planetary screw-shaped gear are formed in screw shapes being in reverse directions to each other, equal in lead angle, and equal in screw pitch and are meshed with each other, the driven female screw-shaped gear of the driven internal gear and the planetary screw-shaped gear are formed in screw shapes, equal in lead angle and equal in screw pitch to each other, and are meshed with each other, the planetary spur gear is meshed with the sun spur gear and with the driven internal spur gear, a ratio of effective screw diameters of the meshing sun screw-shaped gear and planetary screw-shaped gear is coincident with a ratio of screw thread numbers, and a ratio of effective screw diameters of the meshing driven female-screw-shaped gear and planetary screw-shaped gear is coincident with a ratio of screw thread numbers, and wherein the planetary gears are supported about axes at equiangular intervals around the sun gear, a number of the planetary gears is equal to a sum of a thread number of the sun screw-shaped gear of the sun gear and a thread number of the driven female screw-shaped gear of the driven internal gear or a divisor of the sum of these threads numbers.

12. The magical planetary gear speed reducer according to claim 11, wherein at least one of the planetary spur gears provided in the planetary gear is formed in a shape capable of screw meshing with the driven female screw-shaped gear and a sun screw-shaped gear of the sun gear.

13. A rotating bearing device of a rotating translation device including a translatory body disposed to be linearly movable and having a threaded hole, and a screw shaft screwed in the threaded hole, said rotating bearing device comprising:

the planetary gear device according to claim 1, wherein the screw shaft is formed coaxially with a sun gear of the planetary gear device and fixed by coupling, and wherein the a planetary gear device functions as a bearing and speed reducing mechanism of the rotating translation device.

* * * * *